(12) United States Patent
Ogura

(10) Patent No.: US 11,508,137 B2
(45) Date of Patent: Nov. 22, 2022

(54) STORAGE MEDIUM STORING INFORMATION PROCESSING PROGRAM, INFORMATION PROCESSING APPARATUS, INFORMATION PROCESSING SYSTEM, AND INFORMATION PROCESSING METHOD FOR ENLARGING/REDUCING AN OBJECT IN A VIRTUAL SPACE

(71) Applicant: NINTENDO CO., LTD., Kyoto (JP)

(72) Inventor: Yuta Ogura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 397 days.

(21) Appl. No.: 16/811,221

(22) Filed: Mar. 6, 2020

(65) Prior Publication Data
US 2020/0294320 A1 Sep. 17, 2020

(30) Foreign Application Priority Data

Mar. 15, 2019 (JP) .............................. JP2019-048715

(51) Int. Cl.
| | | |
|---|---|---|
| *G06T 19/20* | (2011.01) | |
| *G06T 7/73* | (2017.01) | |
| *A63F 13/24* | (2014.01) | |

(52) U.S. Cl.
CPC .............. *G06T 19/20* (2013.01); *G06T 7/75* (2017.01); *A63F 13/24* (2014.09); *A63F 2300/66* (2013.01); *G06T 2219/2016* (2013.01)

(58) Field of Classification Search
CPC ..................................................... G06T 19/20
See application file for complete search history.

(56) References Cited

U.S. PATENT DOCUMENTS

| | | | | |
|---|---|---|---|---|
| 6,426,745 | B1* | 7/2002 | Isaacs ................. | G06F 3/04845 345/619 |
| 2012/0032958 | A1* | 2/2012 | Werline ................. | G06T 19/20 345/419 |
| 2014/0229871 | A1 | 8/2014 | Tai et al. | |
| 2021/0141514 | A1* | 5/2021 | Fischer ............... | G06F 3/04815 |

FOREIGN PATENT DOCUMENTS

| | | |
|---|---|---|
| EP | 0 899 692 | 3/1999 |
| JP | 2017-021495 | 1/2017 |

OTHER PUBLICATIONS

Jing Hua et al., "Design and Manipulation of Polygonal Models in a Haptic, Stereoscopic Virtual Environment," Fibres and Optical Passive Components, Proceedings of the International Conference on Shape Modeling and Applications, IEEE Computer Society, Jun. 2005, pp. 145-154.

(Continued)

*Primary Examiner* — Shivang I Patel
(74) *Attorney, Agent, or Firm* — Nixon & Vanderhye, PC

(57) ABSTRACT

A three-dimensional object for which three orthogonal object axes are set is disposed in a virtual space. One or two of the three object axes are determined as an enlargement/reduction axis, based on an orientation of the three-dimensional object in the virtual space. A user's operation input is associated with the enlargement/reduction axes. The three-dimensional object is at least enlarged or reduced based on the association of the user's operation input with the enlargement/reduction axes.

16 Claims, 22 Drawing Sheets

(56) References Cited

OTHER PUBLICATIONS

Vladislav Kraevoy et al., "Non-homogeneous Resizing of Complex Models," ACM Transactions on Graphics, vol. 27, No. 5, Article 111, Dec. 2008, pp. 1-9.
Neter Cadx: "Learning Rhino—Scale Function in Rhino," YouTube, Mar. 21, 2014, 3 pages. https://www.youtube.com/watch?v=mnM-WE916ss.
Extended European Search Report dated Aug. 4, 2020 in corresponding European Application No. 20161988.9, 10 pages.

* cited by examiner

F I G. 1
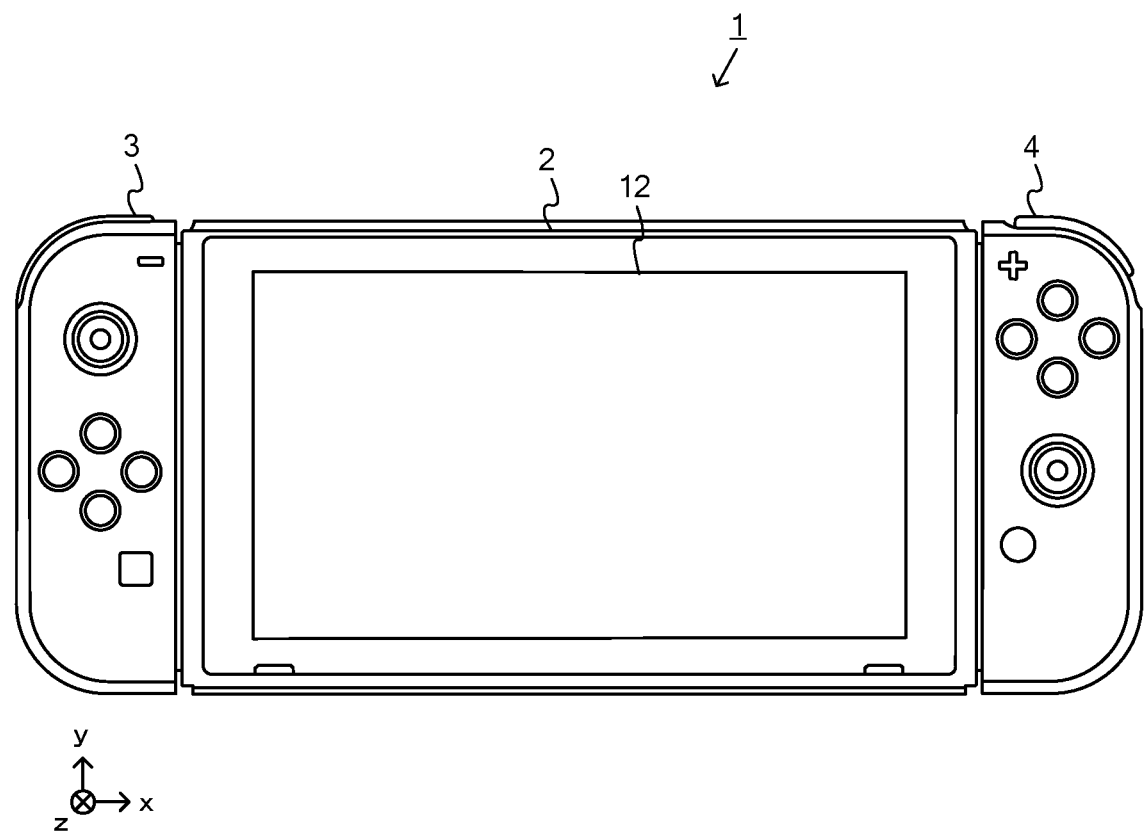

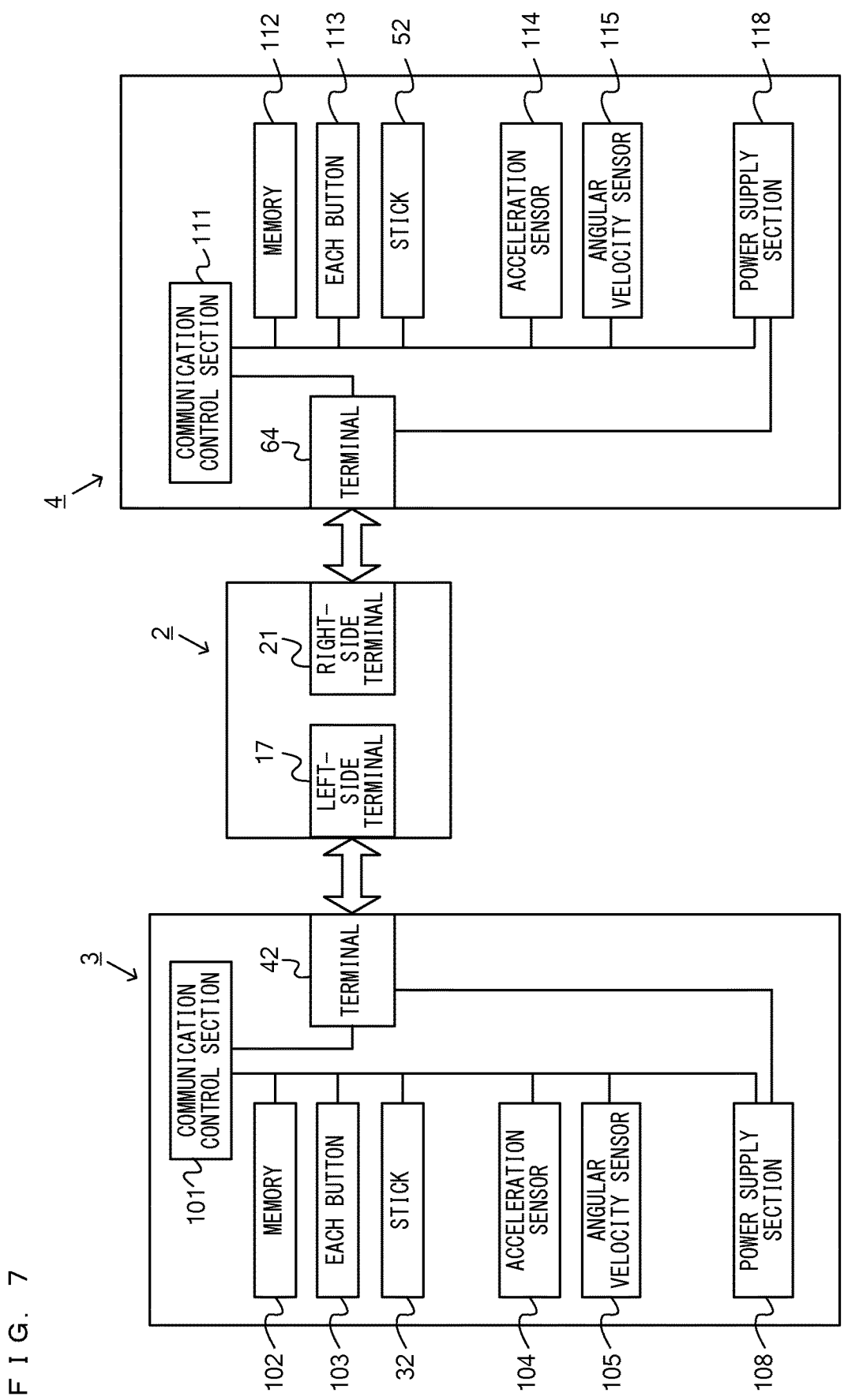
F I G. 7

STORAGE MEDIUM STORING INFORMATION PROCESSING PROGRAM, INFORMATION PROCESSING APPARATUS, INFORMATION PROCESSING SYSTEM, AND INFORMATION PROCESSING METHOD FOR ENLARGING/REDUCING AN OBJECT IN A VIRTUAL SPACE

CROSS REFERENCE TO RELATED APPLICATIONS

The disclosure of Japanese Patent Application No. 2019-48715, filed Mar. 15, 2019, is incorporated herein by reference.

FIELD

The technology disclosed herein relates to a storage medium storing an information processing program, information processing apparatus, information processing system, and information processing method that perform a process of enlarging and/or reducing an object in a virtual space.

BACKGROUND AND SUMMARY

There is a conventional information processing apparatus that enlarges and/or reduces an object in a virtual space according to a user's operation. For example, such an information processing apparatus can change the size of a three-dimensional object which is a cube, according to an operation of specifying a corner of the cube and then moving an indication arrow from the corner.

However, for the above information processing apparatus, there is room for improvement in enlarging and/or reducing an object in a virtual space as intended by the user.

Therefore, it is an object of this non-limiting example to provide a storage medium storing an information processing program, information processing apparatus, information processing system, and information processing method that can enlarge and/or reduce an object in a virtual space as intended by the user.

To achieve the object, this non-limiting example may employ the following features, for example.

A non-limiting example configuration of a non-transitory computer-readable storage medium according to this non-limiting example has stored therein an information processing program which is executed by a computer of an information processing apparatus and which is for enlarging or reducing an object in a virtual space, the information processing program causing the computer to execute: disposing, in the virtual space, a three-dimensional object for which three orthogonal object axes are set; determining one or two of the three object axes as an enlargement/reduction axis, based on an orientation of the three-dimensional object in the virtual space; associating a user's operation input with the enlargement/reduction axes; and at least enlarging or reducing the three-dimensional object based on the association of the user's operation input with the enlargement/reduction axes.

With the above configuration, in the case where an object is enlarged and/or reduced in a virtual space, one or two of three object axes set for the object are set as an enlargement/reduction axis based on an orientation of the object in the virtual space, and therefore, the object can be enlarged and/or reduced as intended by the user.

Two of the three object axes may be determined as the enlargement/reduction axes. The three-dimensional object may be enlarged or reduced in directions pointed by the two enlargement/reduction axes, based on the association.

With the above configuration, the direction corresponding to the user's operation is the same as the direction in which the object is enlarged and/or reduced, and therefore, the direction in which the object is enlarged and/or reduced can be easily recognized.

The directions pointed by the two enlargement/reduction axes may each be associated with a positive direction for enlargement or a negative direction for reduction, based on a surface position of the three-dimensional object overlaid by a pointed position indicated by the user's operation input.

With the above configuration, the direction in which the object is to be enlarged and/or reduced is associated with a position overlaid by the pointed position, and therefore, the direction in which the object is to be enlarged and/or reduced can be easily recognized by the user.

Each of the three object axes may pass through a reference point fixed in the three-dimensional object. When an intersection point obtained by projecting the surface position of the three-dimensional object corresponding to the pointed position perpendicularly onto each of the two enlargement/reduction axes is moved away from the reference point, the axis direction may be associated with enlargement, and when the intersection point is moved toward the reference point, the axis direction may be associated with reduction.

With the above configuration, the enlargement/reduction direction of the object can be intuitive for the user.

The enlarging or reducing the object may include setting, as an enlargement/reduction intersection point, an intersection point between a plane including an aiming direction connecting a virtual camera in the virtual space and a position in the virtual space corresponding to the pointed position, and a direction pointing from the virtual camera toward a first one of the two enlargement/reduction axes, and a straight line extending from the reference point pointing in a direction pointed by a second one of the two enlargement/reduction axes, and calculating the amount of enlargement or the amount of reduction of the object along the second one of the two enlargement/reduction axes, according to the amount of movement of the enlargement/reduction intersection point occurring according to movement of the pointed position.

With the above configuration, the enlargement/reduction amount of the object can be intuitive for the user.

When the user's operation input for moving the pointed position in a first direction is continued even after the three-dimensional object is enlarged to an upper limit according to the amount of an operation of moving the pointed position in the first direction according to the user's operation input, the enlargement of the three-dimensional object may be stopped and maintained at the upper limit, and when the user's operation input is switched from the user's operation input for moving the pointed position maintained at the upper limit in the first direction to the user's operation input for moving the pointed position in a second direction opposite to the first direction, the three-dimensional object may be reduced according to the amount of an operation of moving the pointed position in the second direction from the switching time point.

With the above configuration, the process of reducing the object can be intuitively performed by the user.

The three-dimensional object may be reduced in a first reduction direction according to the user's operation input in a third direction, and the three-dimensional object may be enlarged in a first enlargement direction opposite to the first reduction direction according to the user's operation input in a fourth direction. When the user's operation input in the third direction is continued after the three-dimensional object is reduced to a lower limit in the first reduction direction according to the user's operation input in the third direction, the three-dimensional object may be enlarged in the first enlargement direction after the three-dimensional object reaches the lower limit. When the user's operation input in the fourth direction is performed after the three-dimensional object reaches the lower limit and then the three-dimensional object is enlarged in the first enlargement direction, the three-dimensional object may be reduced in the first reduction direction.

With the above configuration, the process of enlarging the object again after reducing the object can be intuitively performed by the user.

The virtual space may have a field surface. In that case, when the three-dimensional object is enlarged, overlapping the field surface, a state that the three-dimensional object is enlarged or reduced with the overlapping maintained may be displayed on a display section. When the three-dimensional object overlaps the field surface at the time that the enlargement or reduction of the three-dimensional object is finished, the three-dimensional object may be moved to a position where the overlapping state is eliminated, and is displayed on the display section.

With the above configuration, the object can be enlarged and/or reduced as intended by the user without the operation of enlarging and/or reducing the object being hindered by the field surface. In addition, the enlargement/reduction process can be prevented from being finished with the object overlapping the field surface.

A plurality of three-dimensional objects may be disposed in the virtual space. When a first one of the three-dimensional objects is enlarged overlapping with a second one of the three-dimensional objects, a state that the first one of the three-dimensional objects is enlarged or reduced with the overlapping state maintained may be displayed on a display section. When the first one of the three-dimensional objects overlaps with the second one of the three-dimensional objects at the time that the enlargement or reduction of the three-dimensional object is finished, a state that the first one of the three-dimensional objects is maintained at a position where the first one of the three-dimensional objects is maintained in the overlapping state may be displayed on the display section.

With the above configuration, the object can be enlarged and/or reduced as intended by the user without the operation of enlarging and/or reducing the object being hindered due to the presence of another object. In addition, the enlargement/reduction process can be finished with the object maintained overlapping another object.

In the virtual space, three fixed, orthogonal world coordinate axes may be set. Two world coordinate axes may be selected from the three world coordinate axes based on a position and orientation of the three-dimensional object with respect to a virtual camera in the virtual space, and the enlargement/reduction axes may be determined using a positional relationship between the two selected world coordinate axes and the three object axes.

With the above configuration, the object can be enlarged and/or reduced with reference to world coordinate axes set in the virtual space.

A screen coordinate system having three screen coordinate axes with reference to a position and orientation of a virtual camera in the virtual space may be set. Two screen coordinate axes may be selected from the three screen coordinate axes based on the orientation of the virtual camera and the orientation of the three-dimensional object, and the enlargement/reduction axes may be determined using a positional relationship between the two selected screen coordinate axes and the three object axes.

With the above configuration, the object can be enlarged and/or reduced with reference to screen coordinate axes set for the virtual camera.

One or two of the three object axes having a smallest differential angle with respect to a screen plane based on an orientation of a virtual camera in the virtual space may be determined as the enlargement/reduction axes.

With the above configuration, the object can be enlarged and/or reduced with reference to a screen plane.

In the virtual space, one or two of the three object axes having a greatest differential angle with respect to a line-of-sight direction of a virtual camera in the virtual space may be determined as the enlargement/reduction axes.

With the above configuration, the object can be enlarged and/or reduced with reference to a line-of-sight direction of the virtual camera.

In addition, this non-limiting example may be carried out in the form of an information processing apparatus, information processing system, and information processing method.

According to this non-limiting example, in the case where an object is enlarged and/or reduced in a virtual space, one or two of three object axes set for the object are set as an enlargement/reduction axis based on an orientation of the object in the virtual space. Therefore, the object can be enlarged and/or reduced as intended by the user.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 1 is a diagram showing a non-limiting example of a state that a left controller 3 and a right controller 4 are attached to a main body apparatus 2 in a non-limiting example of a game system according to this non-limiting example, FIG. 7 is a block diagram showing a non-limiting example of an internal configuration of the game system 1.

DETAILED DESCRIPTION OF NON-LIMITING EXAMPLE EMBODIMENTS

Figure 2:
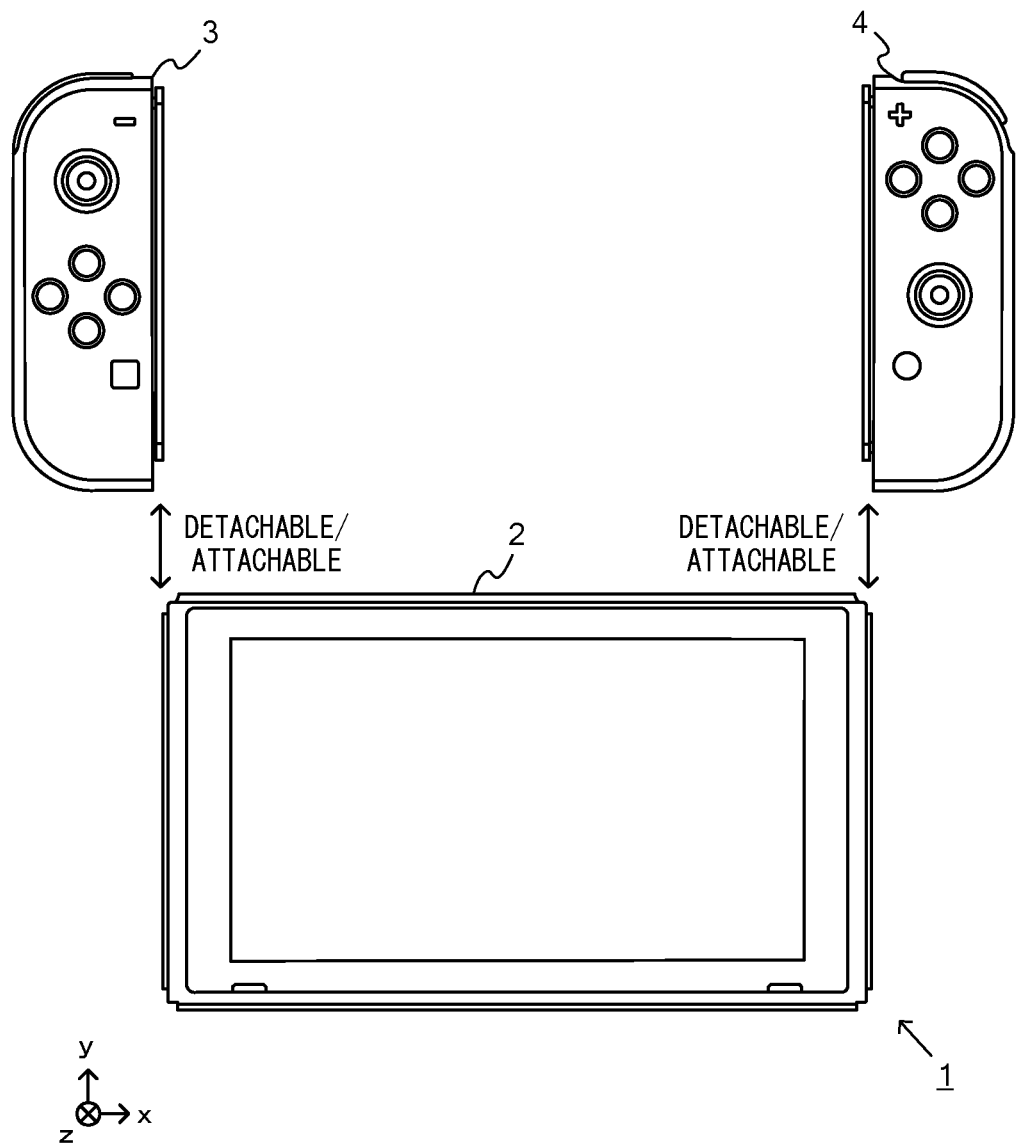
FIG. 2 is a diagram showing a non-limiting example of a state that each of the left controller 3 and the right controller 4 is detached from the main body apparatus 2.

An information processing system according to this non-limiting example will now be described. The information processing system of this non-limiting example, which is, for example, a game system 1, includes a main body apparatus (information processing apparatus; in this non-limiting example, serving as a game device main body) 2, and a left controller 3 and a right controller 4. The left controller 3 and the right controller 4 are attachable to and detachable from the main body apparatus 2. That is, when the left controller 3 and the right controller 4 are attached to the main body apparatus 2, and the game system 1 can be used as a unified apparatus. Also in the game system 1, the main body apparatus 2 and the left controller 3 and the right controller 4 can be used separately from each other (see FIG. 2). A hardware configuration of the game system 1 of this non-limiting example will now be described before the control of the game system 1 of this non-limiting example is described FIG. 1 is a diagram showing a non-limiting example of the state that the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

FIG. 2 is a diagram showing a non-limiting example of the state that each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
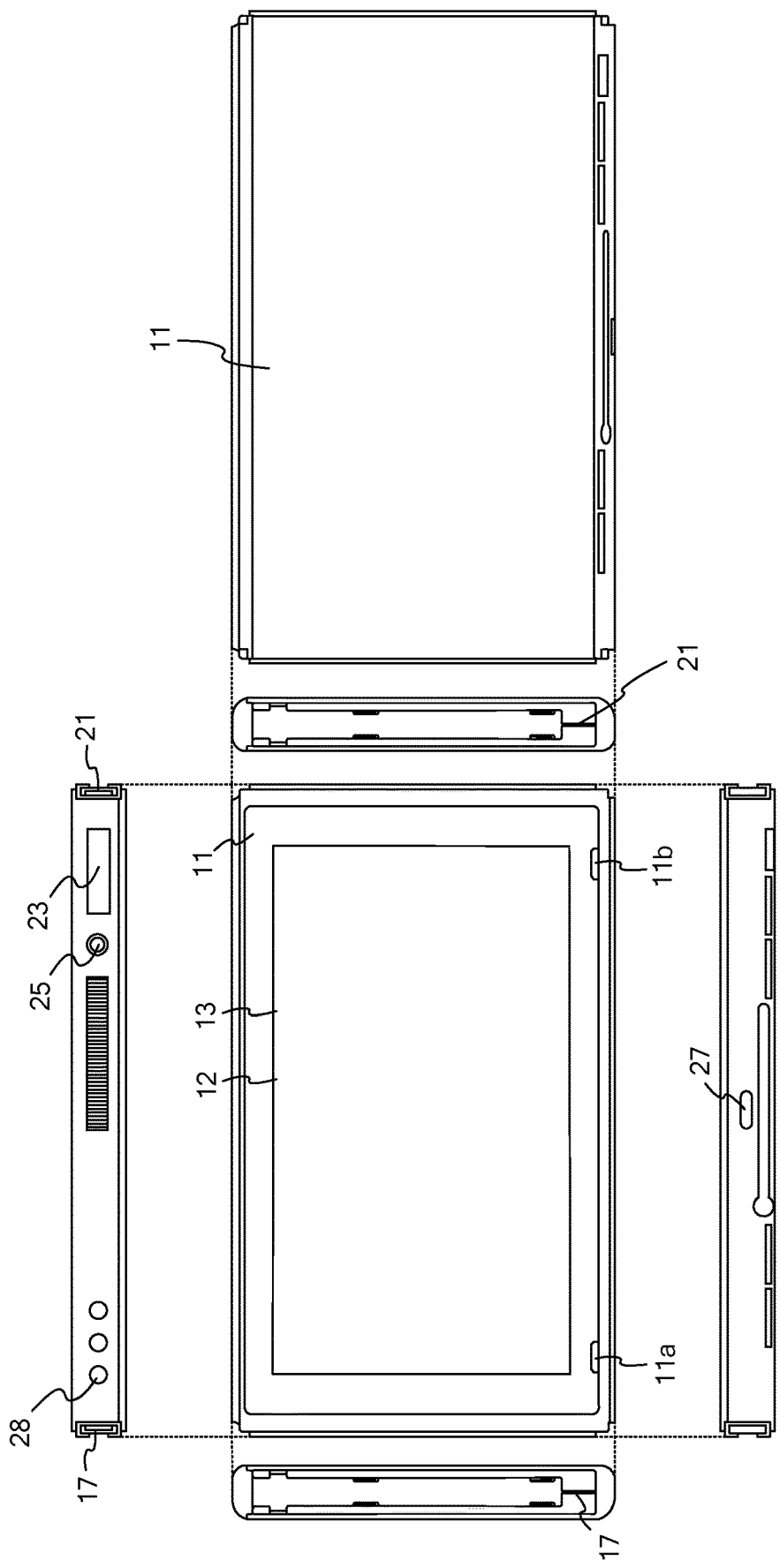
FIG. 3 is six orthogonal views showing a non-limiting example of the main body apparatus 2.

FIG. 3 is six orthogonal views showing a non-limiting example of the main body apparatus 2. As shown in FIG. 3, the main body apparatus 2 includes an approximately plate-shaped housing 11. In this non-limiting example, a main surface (in other words, a surface on a front side, i.e., a surface on which the display 12 is provided) of the housing 11 has a generally rectangular shape.

It should be noted that the shape and the size of the housing 11 are optional. As a non-limiting example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In this non-limiting example, the display 12 is a liquid crystal display device (LCD). The display 12, however, may be a display device of any type.

In addition, the main body apparatus 2 includes a touch panel 13 on the screen of the display 12. In this non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 shown in FIG. 6) inside the housing 11. As shown in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In this non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in this non-limiting example, the cradle has the function of charging the unified apparatus or the main body apparatus 2 alone, being placed thereon. The cradle also functions as a hub device (specifically, a USB hub).

The main body apparatus 2 includes an illuminance sensor 29. In this non-limiting example, the illuminance sensor 29, which is provided under the main surface of the housing 11, detects the illuminance (brightness) of light entering from the main surface of the housing 11. Note that the display 12 can be adjusted to an appropriate brightness for displaying an image according to the illuminance of light detected by the illuminance sensor 29. In this non-limiting example, it can be determined whether or not the main body apparatus 2 is attached to a goggles device described below, based on the detected illuminance.

Figure 4:
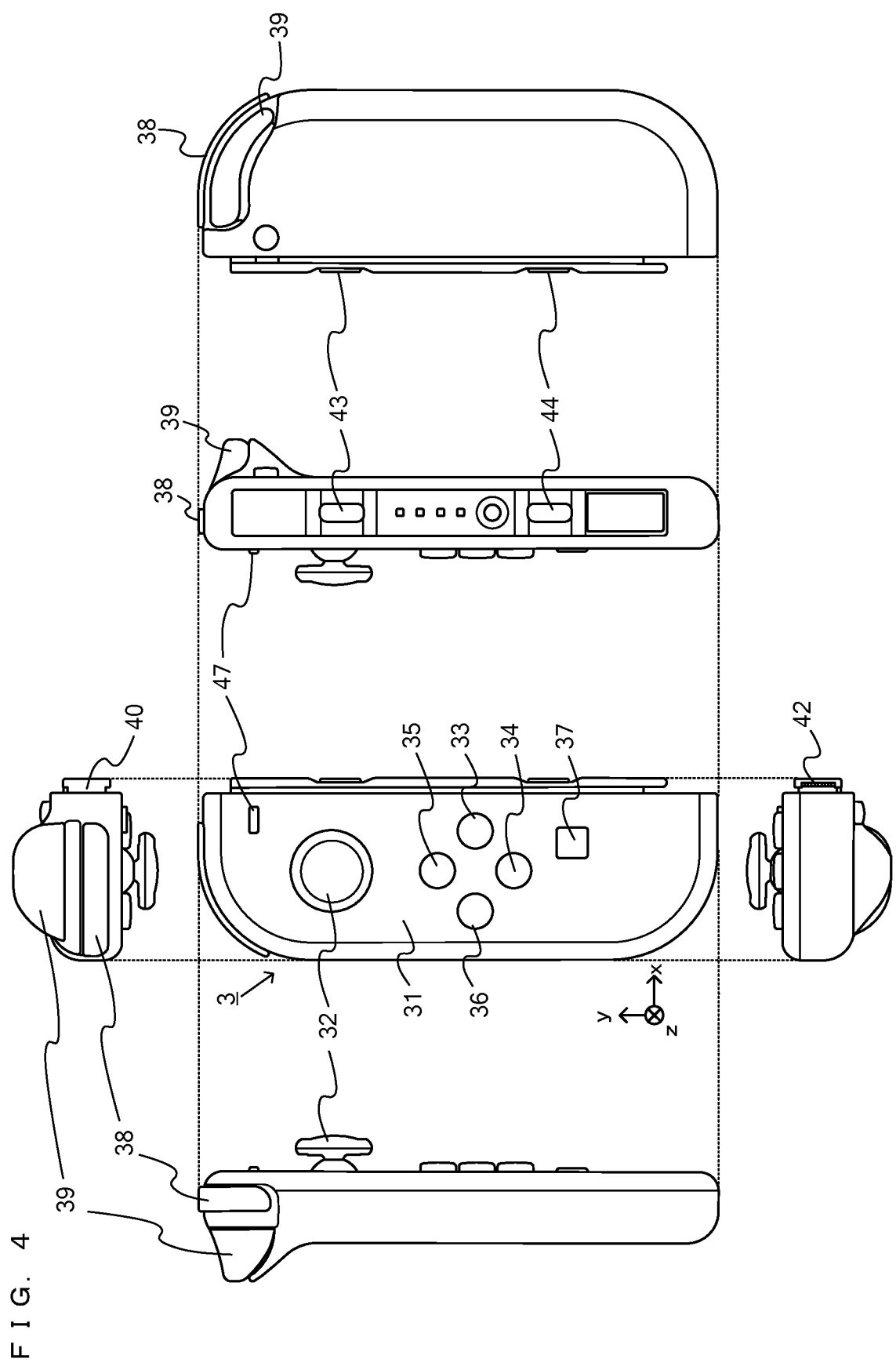
FIG. 4 is six orthogonal views showing a non-limiting example of the left controller 3.

FIG. 4 is six orthogonal views showing a non-limiting example of the left controller 3. As shown in FIG. 4, the left controller 3 includes a housing 31. In this non-limiting example, the housing 31 has a vertically long shape, e.g., is shaped to be long in an up-down direction (i.e., a y-axis direction shown in FIGS. 1 and 4). In the state that the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in this non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−"(minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
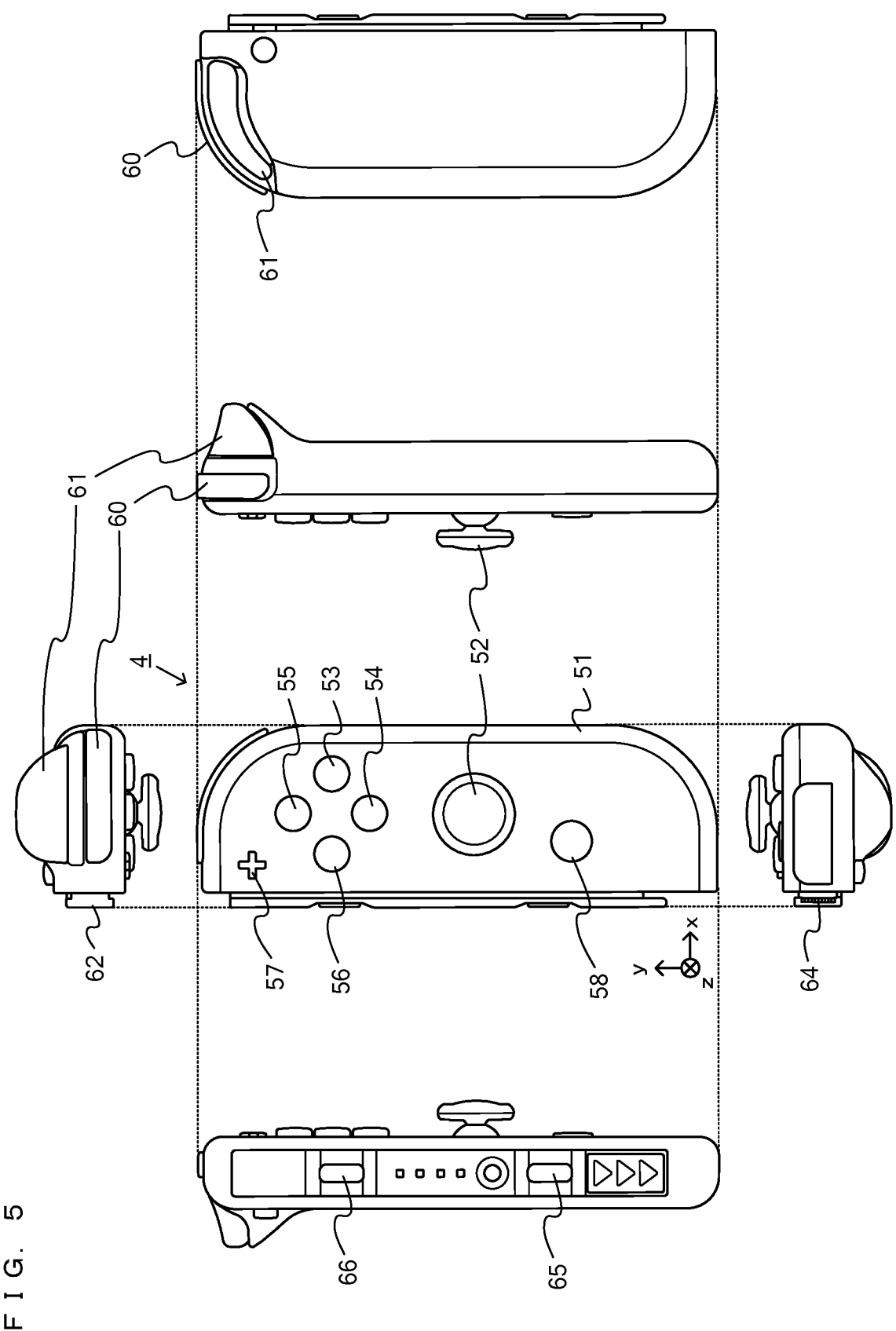
FIG. 5 is six orthogonal views showing a non-limiting example of the right controller 4.

FIG. 5 is six orthogonal views showing a non-limiting example of the right controller 4. As shown in FIG. 5, the right controller 4 includes a housing 51. In this non-limiting example, the housing 51 has a vertically long shape, e.g., is shaped to be long in the up-down direction. In the state that the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In this non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
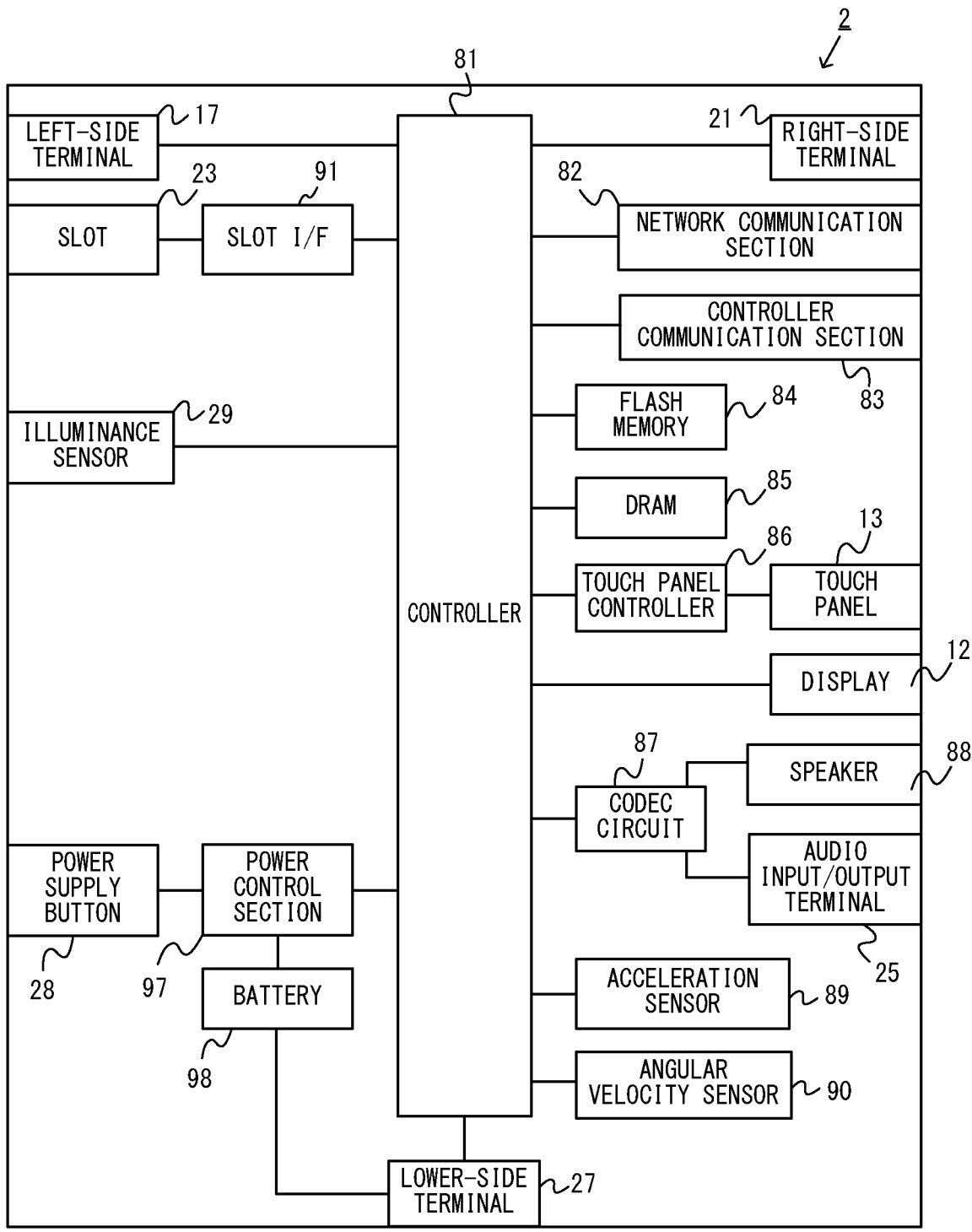
FIG. 6 is a block diagram showing a non-limiting example of an internal configuration of the main body apparatus 2.

FIG. 6 is a block diagram showing a non-limiting example of an internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are coupled to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is coupled to the processor 81. The slot I/F 91 is coupled to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is coupled to the processor 81. The network communication section 82 communicates (specifically, through wireless communication) with an external apparatus via a network. In this non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication", in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is coupled to the processor 81. The controller communication section 83 wirelessly communicates with the left controller 3 and/or the right controller 4. The main body apparatus 2 may communicate with the left and right controllers 3 and 4 using any suitable communication method. In this non-limiting example, the controller communication section 83 performs communication with the left and right controllers 3 and 4 in accordance with the Bluetooth (registered trademark) standard.

The processor 81 is coupled to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in this non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. In a non-limiting example, a first user can provide an input to the main body apparatus 2 using a first set of left and right controllers 3 and 4, and at the same time, a second user can provide an input to the main body apparatus 2 using a second set of left and right controllers 3 and 4.

The main body apparatus 2 includes a touch panel controller 86 that is a circuit for controlling the touch panel 13. The touch panel controller 86 is coupled between the touch panel 13 and the processor 81. Based on a signal from the touch panel 13, the touch panel controller 86 generates, for example, data indicating a position where a touch input has been performed. Then, the touch panel controller 86 outputs the data to the processor 81.

Further, the display 12 is coupled to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is coupled to the speakers 88 and an audio input/output terminal 25 and also coupled to the processor 81. The codec circuit 87 is for controlling the input and output of audio data to and from the speakers 88 and the sound input/output terminal 25.

Further, the main body apparatus 2 includes an acceleration sensor 89. In this non-limiting example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this non-limiting example, the angular velocity sensor 90 detects angular velocities about predetermined three axes (e.g., the x-, y-, and z-axes shown in FIG. 1). It should be noted that the angular velocity sensor 90 may detect an angular velocity about one axis or angular velocities about two axes.

The acceleration sensor 89 and the angular velocity sensor 90 are coupled to the processor 81. The detection results of the acceleration sensor 89 and the angular velocity sensor 90 are output to the processor 81. Based on the detection results of the acceleration sensor 89 and the angular velocity sensor 90, the processor 81 can calculate information about a motion and/or orientation of the main body apparatus 2.

The illuminance sensor 29 is coupled to the processor 81. The illuminance sensor 29 outputs the result of detection to the processor 81. Based on the detection result of the illuminance sensor 29, the processor 81 can calculate information about brightness around the main body apparatus 2. As a non-limiting example, when the main body apparatus 2 is attached to a goggles device described below, brightness around the main body apparatus 2 is reduced. Therefore, based on the detection result of the illuminance sensor 29, the processor 81 can determine whether or not the main body apparatus 2 is attached to the goggles device.

The main body apparatus 2 includes a power control section 97 and a battery 98. The power control section 97 is coupled to the battery 98 and the processor 81. Further, although not shown, the power control section 97 is coupled to components of the main body apparatus 2 (specifically, components that receive power supplied from the battery 98, the left-side terminal 17, and the right-side terminal 21).

Based on a command from the processor 81, the power control section 97 controls the supply of power from the battery 98 to each of the above components.

Further, the battery 98 is coupled to the lower-side terminal 27. When an external charging device (e.g., the cradle) is coupled to the lower-side terminal 27, and power is supplied to the main body apparatus 2 via the lower-side terminal 27, the battery 98 is charged with the supplied power.

FIG. 7 is a block diagram showing non-limiting examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, a communication control section 101 is coupled to components including the terminal 42. In this non-limiting example, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In this non-limiting example, the acceleration sensor 104 detects the magnitudes of accelerations along predetermined three axial (e.g., x-, y, and z-axes shown in FIG. 4) directions. It should be noted that the acceleration sensor 104 may detect an acceleration along one axial direction or accelerations along two axial directions. In this non-limiting example, an angular velocity sensor 105 detects angular velocities about predetermined three axes (e.g., the x-, y, and z-axes shown in FIG. 4). It should be noted that the angular velocity sensor 105 may detect an angular velocity about one axis or angular velocities about two axes. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In this non-limiting example, the power supply section 108 includes a battery and a power control circuit. Although not shown in FIG. 8, the power control circuit is coupled to the battery and also coupled to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is coupled to the communication control section 111. The communication control section 111 is coupled to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of this non-limiting example, the left controller 3 and the right controller 4 are removable from the main body apparatus 2. The game system 1 will now be described, assuming that the main body apparatus 2 outputs an image with the left controller 3 and the right controller 4 detached from the main body apparatus 2. In the case where the game system 1 is used to perform an operation on an application (e.g., an editor for generating and editing a virtual space, and a game application) with the left controller 3 and the right controller 4 detached from the main body apparatus 2, a single user may use the main body apparatus 2 and the left controller 3 or the right controller 4.

Figure 8:
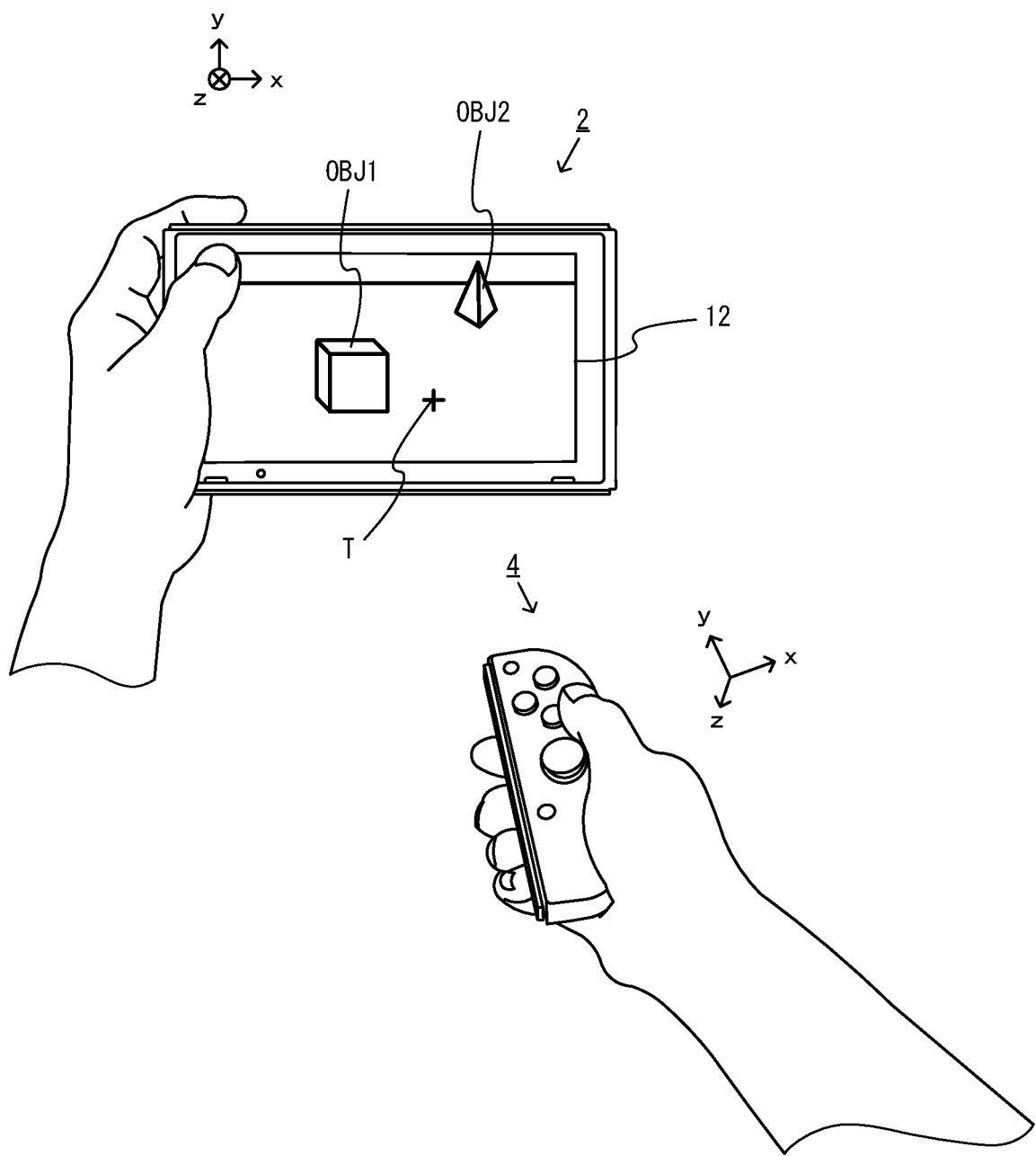
FIG. 8 is a diagram showing a non-limiting example of how a user uses the game system 1 by operating the main body apparatus 2 and the right controller 4.

FIG. 8 is a diagram showing a non-limiting example of how a single user uses the game system 1 by operating the main body apparatus 2 and the right controller 4 with the left controller 3 and the right controller 4 detached from the main body apparatus 2. As shown in FIG. 8, the user can hold the main body apparatus 2 with their left hand, and the right controller 4 with their right hand, and perform an operation while viewing an image displayed on the main body apparatus 2.

For example, in this non-limiting example, the user holds the right controller 4 with a single hand (e.g., the right hand), pointing toward the display 12 of the main body apparatus 2 in the longitudinal direction (upward direction (the positive direction of the y-axis) shown in FIG. 1) of the elongated, generally board-shaped right controller 4, with the side surface (side surface on which a slider 62 is provided) of the right controller 4 which is in contact with the main body apparatus 2 when attached to the main body apparatus 2 facing leftward, and the main surface (surface on which the analog stick 52 and the like are provided) of the right controller 4 facing upward. In other words, the right controller 4 is held by a single hand of the user with the positive direction of the y-axis of the right controller 4 pointing ahead of the user, and the positive direction of the z-axis pointing upward.

In addition, in this non-limiting example, the user holds the main body apparatus 2 with the other hand (e.g., the left hand) with the longitudinal direction (the direction of the x-axis shown in FIG. 1) of the horizontally elongated, generally board-shaped main body apparatus 2 in a horizontal position, and the main surface (surface on which the display 12 and the like are provided) of the main body apparatus 2 facing the user. The main body apparatus 2 is held by the other hand of the user with the negative direction of the z-axis pointing toward the user, and the direction of the x-axis extending horizontally with respect to the ground.

Thus, generation/editing of a virtual space and game play using a virtual space are performed according to an operation of each operation button or a stick of the right controller 4, being held by one hand of the user, or an operation of moving the body of the right controller 4. For example, the acceleration sensor 114 of the right controller 4 can detect an acceleration in each of the x-, y-, and z-axis directions as an operation input. The angular velocity sensor 115 can detect an angular velocity around each of the x-, y-, and z-axis directions as an operation input. The accelerations and/or angular velocities thus detected can be used to calculate the motion and orientation of the body of the right controller 4. In this non-limiting example, as a non-limiting example, an object disposed in a virtual space displayed on the display 12 can be deformed (enlarged/reduced) according to the user's operation using the right controller 4.

In addition, in this non-limiting example, a display range displayed on the display 12 can be changed according to an operation of moving the body of the main body apparatus 2, being held by the other hand of the user. For example, the acceleration sensor 89 of the main body apparatus 2 can detect an acceleration in each of the x-, y-, and z-axis directions as an operation input. The angular velocity sensor 90 can detects an angular velocity around each of the x-, y-, and z-axis directions as an operation input. Therefore, the motion and orientation of the body of the main body apparatus 2 can be calculated using the acceleration and/or the angular velocity. In this non-limiting example, as a non-limiting example, the orientation of a virtual camera that is provided in a virtual space so that an image is displayed on the display 12 can be changed according to a change in the orientation of the main body apparatus 2 in the real space. Specifically, by changing a virtual camera disposed at a fixed position in a virtual space in the same manner as that in which the orientation of the main body apparatus 2 is changed in the real space, an image of the virtual space can be produced which is taken as if the virtual space were viewed through the display 12 of the main body apparatus 2. Note that as another non-limiting example, in addition to the orientation change, the position of the virtual camera in the virtual space may be moved (position change) according to the movement (position change) of the main body apparatus 2 in the real space.

FIG. 8 shows a non-limiting example image that is displayed in a process of deforming (enlarging/reducing) an object in a virtual space by operating the main body apparatus 2 and the right controller 4. As shown in FIG. 8, in this non-limiting example process, an image in which a plurality of objects (a first object OBJ1 and a second object OBJ2 in the non-limiting example of FIG. 8) are disposed in a virtual space is displayed on the main body apparatus 2. Thereafter, the user can set any one of the plurality of objects disposed in the virtual space as an object to be operated, or deform (enlarge/reduce) the set object to be operated in the virtual space, by operating the analog stick 52 and the operation buttons 53-56 of the right controller 4, or moving the body of the right controller 4. The user can also change the orientation of the virtual camera set in the virtual space by changing the orientation of the main body apparatus 2, and thereby change the range of the virtual space that is displayed the display 12.

For example, the display 12 displays a mark T indicating a position (pointed position) that is pointed by the body of the right controller 4. Therefore, the position where the mark T is pointed by the body of the right controller 4 serves as a pointed position where the user inputs a position on the display 12. As a non-limiting example, the mark T is displayed at an initial position (e.g., the center of the display 12) on the display 12 before the displayed position is changed according to a change in the orientation of the body of the right controller 4. When the user performs a predetermined holding operation (e.g., an operation of pressing down the operation button (A-button) 53 and an operation of pressing down the operation button (R-button) 60) using the right controller 4, an object OBJ displayed and overlaid by the pointed position indicated by the mark T at the time of that operation is set as an object to be operated, and a position overlaid by the pointed position indicated by the mark T at the time of that operation is set as a hold position for deforming the object OBJ. Thus, the pointed position by the user's operation, when the holding operation is performed thereon, comes to serve as a hold position for deforming an object OBJ. Thereafter, during a period of time that the holding operation is continued, the state that the object to be operated is set and the hold position is set for that object to be operated is continued. When the holding operation is ended, the state that the object to be operated is set is removed, and the hold position is changed to a normal pointed position. Thus, the hold position indicates a pointed position that is pointed by the user using the body of the right controller 4 with the holding operation being performed.

The object OBJ set as an object to be operated can be deformed (enlarged/reduced) in the virtual space according to a subsequent operation using the right controller 4. For example, in the state that the operation of specifying an object to be operated is continued, when the position indicated by the body of the right controller 4 is moved upward, downward, leftward, or rightward, the hold position set for the object to be operated in the virtual space is moved upward, downward, leftward, or rightward, so that the object OBJ is deformed. Thereafter, when the holding operation is ended, the deformation of the object OBJ is stopped, so that the final shape of the object OBJ as an object to be operated at the final time point is determined, and the process of deforming an object is removed.

Note that the operation method for deforming an object OBJ set as an object to be operated is not limited to the above operation method. For example, an object OBJ set as an object to be operated may be deformed according to an operation of deflecting the stick 52 of the right controller 4. Alternatively, in the case where an object OBJ is operated using a mouse, an object OBJ set as an object to be operated may be deformed according to a pointed position specified by operating the mouse. Alternatively, in the case where an object OBJ is operated using a touch pad, an object OBJ set as an object to be operated may be deformed according to a pointed position specified by operating the touch pad. Alternatively, in the case where an object OBJ is operated using an operation button (e.g., a directional button), an object OBJ may be deformed stepwise according to the number to times the operation button is pressed down.

In addition, the unified apparatus obtained by attaching the left controller 3 and the right controller 4 to the main body apparatus 2 can be operated. In that case, the left controller 3 and the right controller 4 are unified with the main body apparatus 2, and therefore, it is difficult to perform an operation based on a position pointed by the left controller 3 and/or the right controller 4. Therefore, in the operation method of deforming an object OBJ set as an object to be operated using the unified apparatus, the left and right sticks 32 and/or 52 may be used. For example, in the operation of using the unified apparatus, when an operation of pressing down the operation button (A-button) 53 or the operation button (R-button) 60 of the right controller 4, being attached to the main body apparatus 2, is performed, an object OBJ displayed and overlaid by the mark T at the time of the operation is set as an object to be operated, and a hold position is set for the object OBJ. Thereafter, the object OBJ set as an object to be operated is deformed according to an operation of deflecting the stick 32 of the left controller 3 and/or the stick 52 of the right controller 4, with the left controller 3 and the right controller 4 attached to the main body apparatus 2. When the unified apparatus is thus used to perform an operation, the direction of the virtual space displayed on the display 12 is changed according to the orientation of the unified apparatus in the real space. Therefore, the direction in which the stick is deflected may be changed according to the direction of the virtual space. For example, when the unified apparatus is oriented with the downward direction thereof (the negative direction of the y-axis shown in FIG. 1) pointing in the vertical direction of the real space, the downward direction of the display 12 (the negative direction of the y-axis shown in FIG. 1) is the vertical direction in the virtual space. Therefore, if an operation of deflecting the stick 32 of the left controller 3 and/or the stick 52 of the right controller 4 downward (the negative direction of the y-axis shown in FIG. 1) indicates a downward operation instruction in the virtual space displayed on the display 12, such an operation is intuitive. Meanwhile, when the unified apparatus is oriented with the right direction thereof (the positive direction of the x-axis shown in FIG. 1) pointing in the vertical direction of the real space, the right direction of the display 12 (the positive direction of the x-axis shown in FIG. 1) is the vertical direction in the virtual space. Therefore, if an operation of deflecting the stick 32 of the left controller 3 and/or the stick 52 of the right controller 4 rightward (the positive direction of the x-axis shown in FIG. 1) indicates a downward operation instruction in the virtual space displayed on the display 12, such an operation is intuitive.

Figure 9:
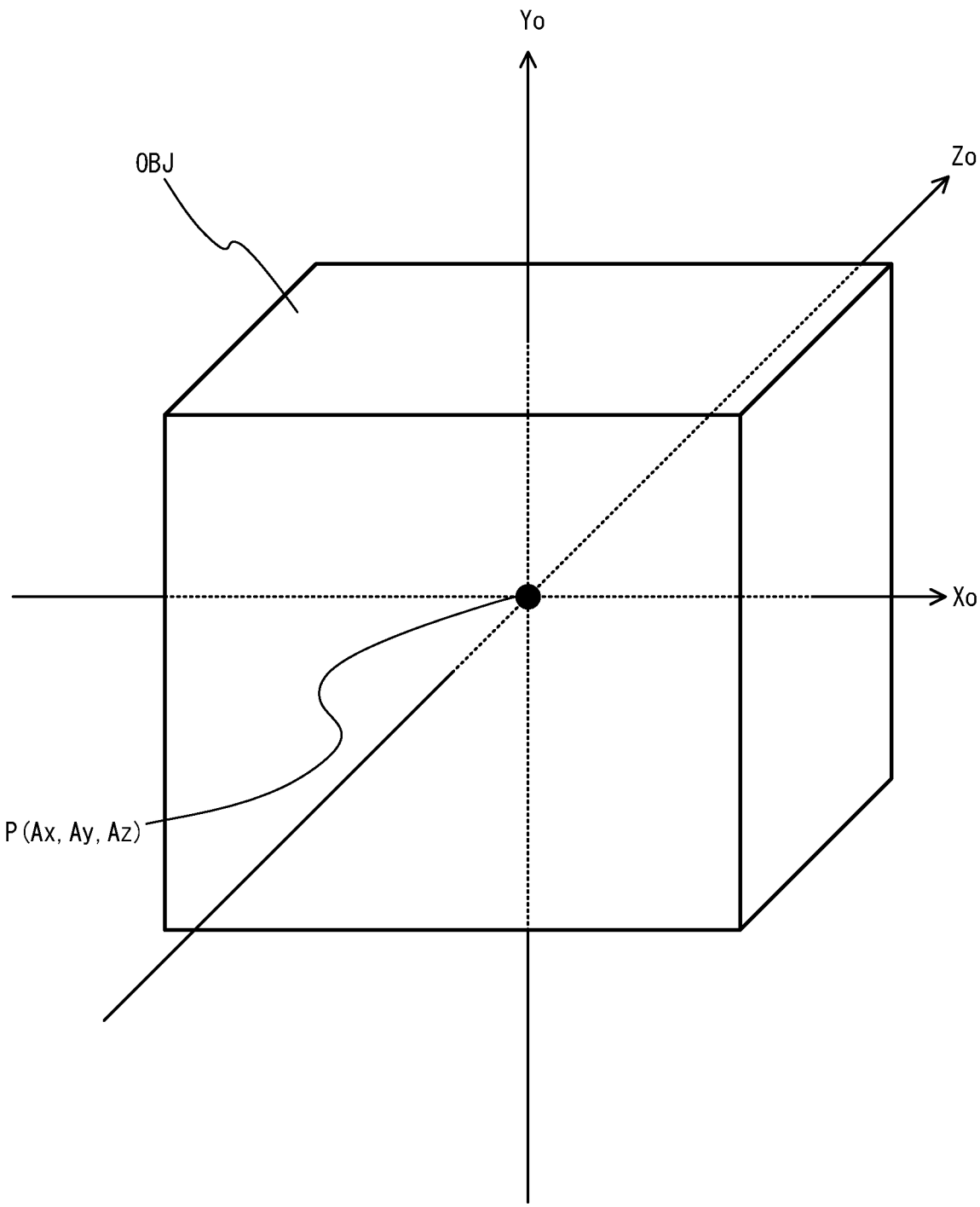
FIG. 9 is a diagram showing a non-limiting example of object axes set for a rectangular parallelepiped object OBJ.
Figure 10:
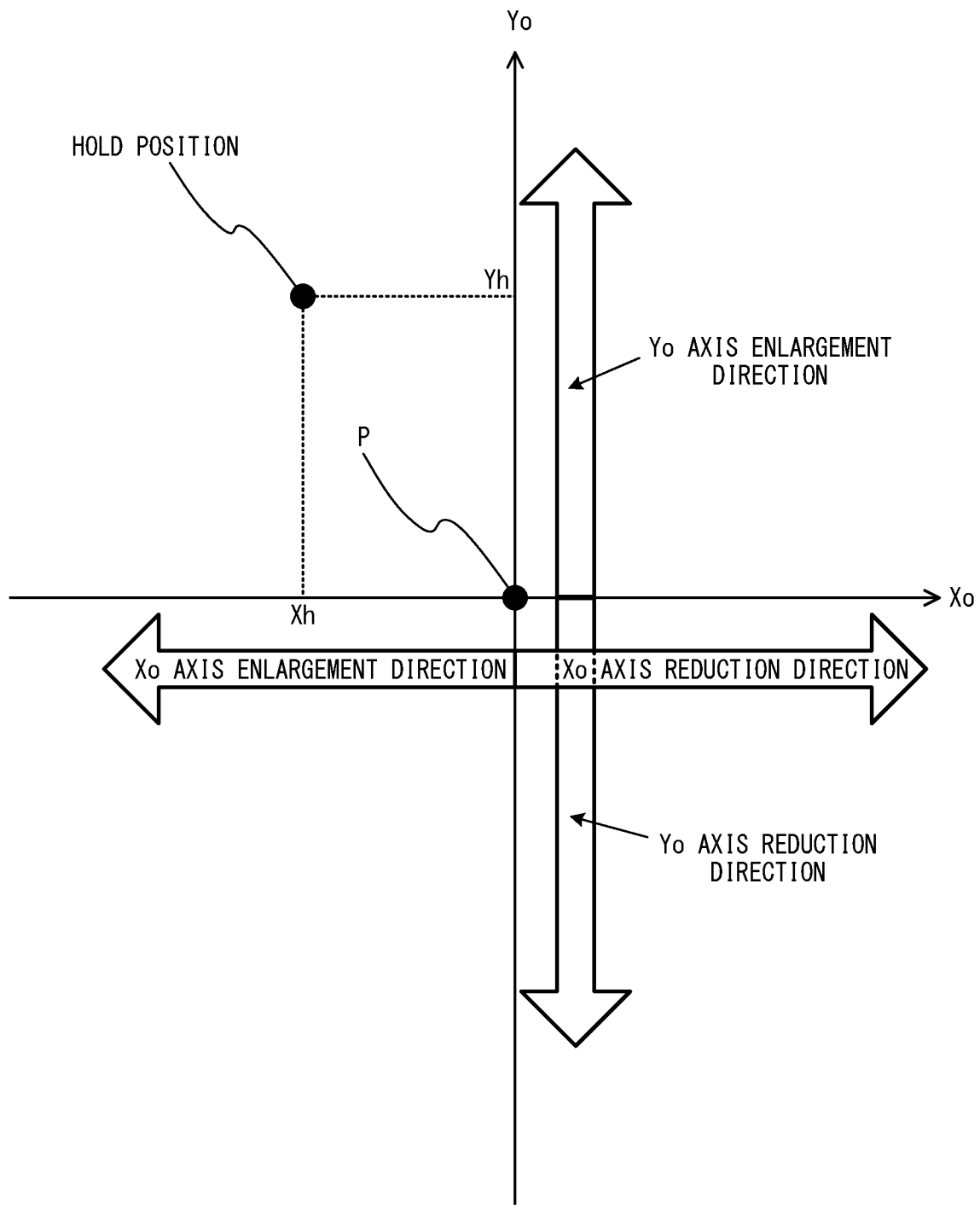
FIG. 10 is a diagram showing a non-limiting example of an enlargement direction and reduction direction of each enlargement/reduction axis.
Figure 11:
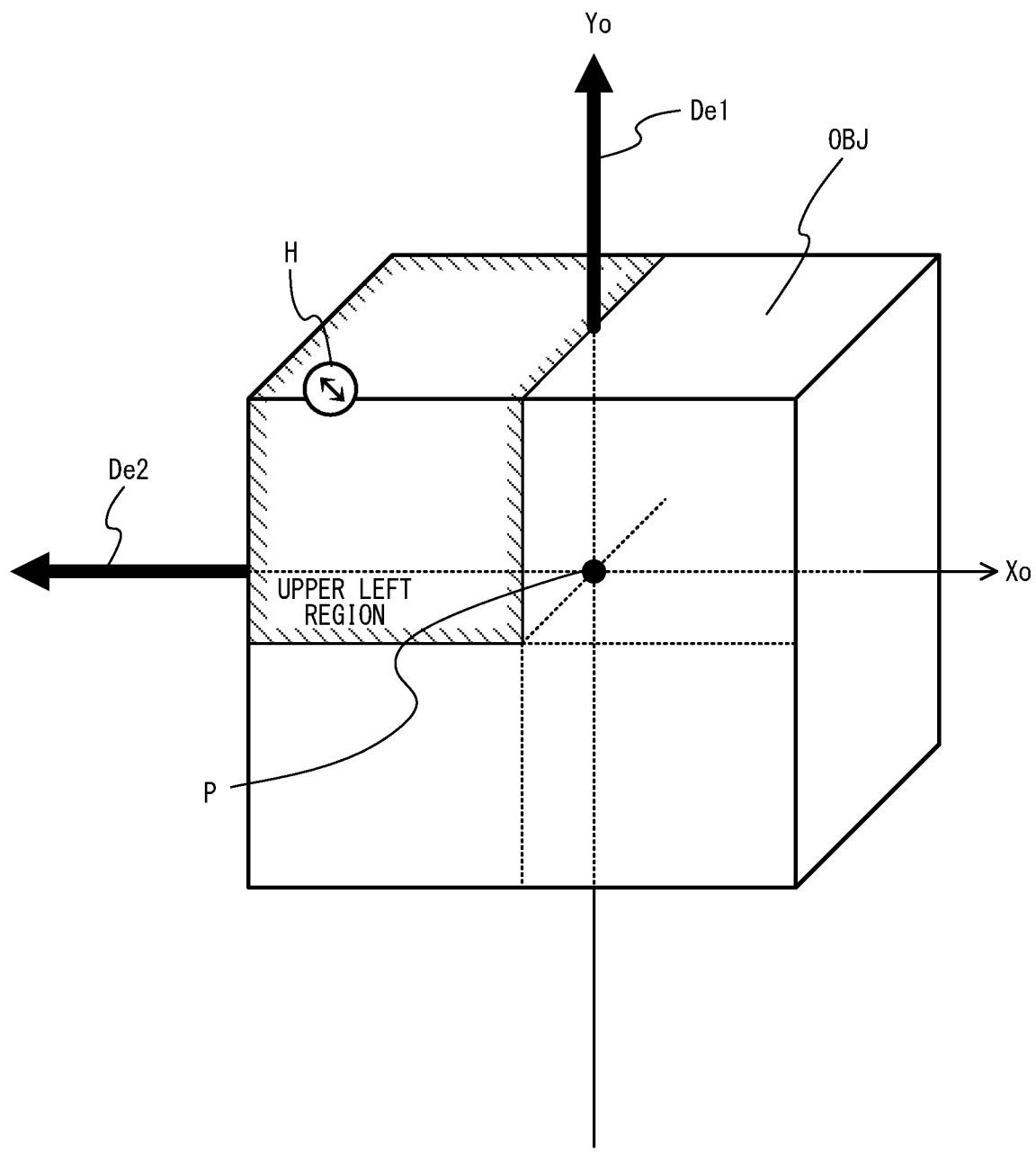
FIG. 11 is a diagram showing a non-limiting example of enlargement/reduction axes De1 and De2 in the case where a hold position H is located in an upper left region of an object OBJ.
Figure 12:
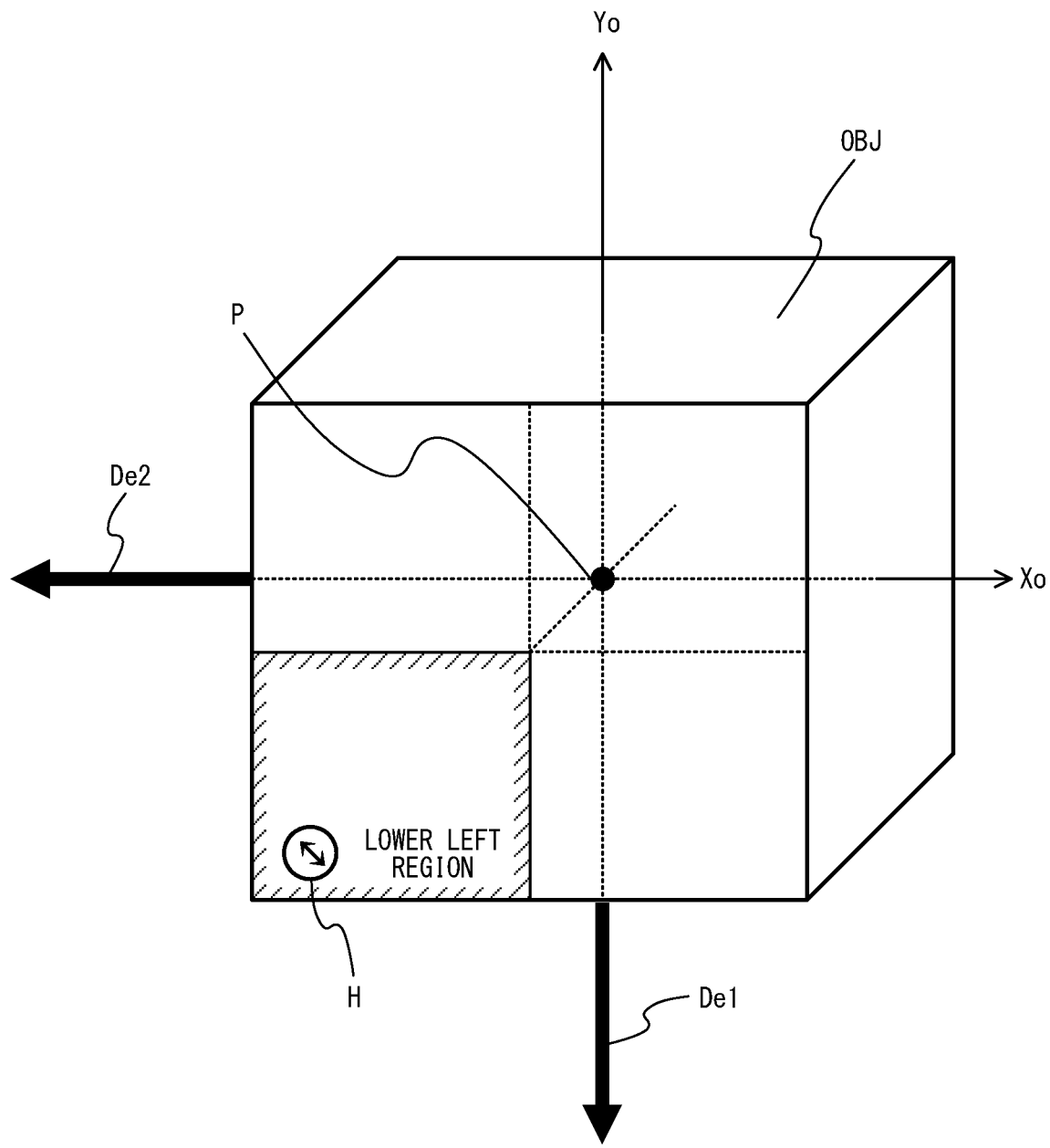
FIG. 12 is a diagram showing a non-limiting example of enlargement/reduction axes De1 and De2 in the case where a hold position H is located in a lower left region of an object OBJ.
Figure 13:
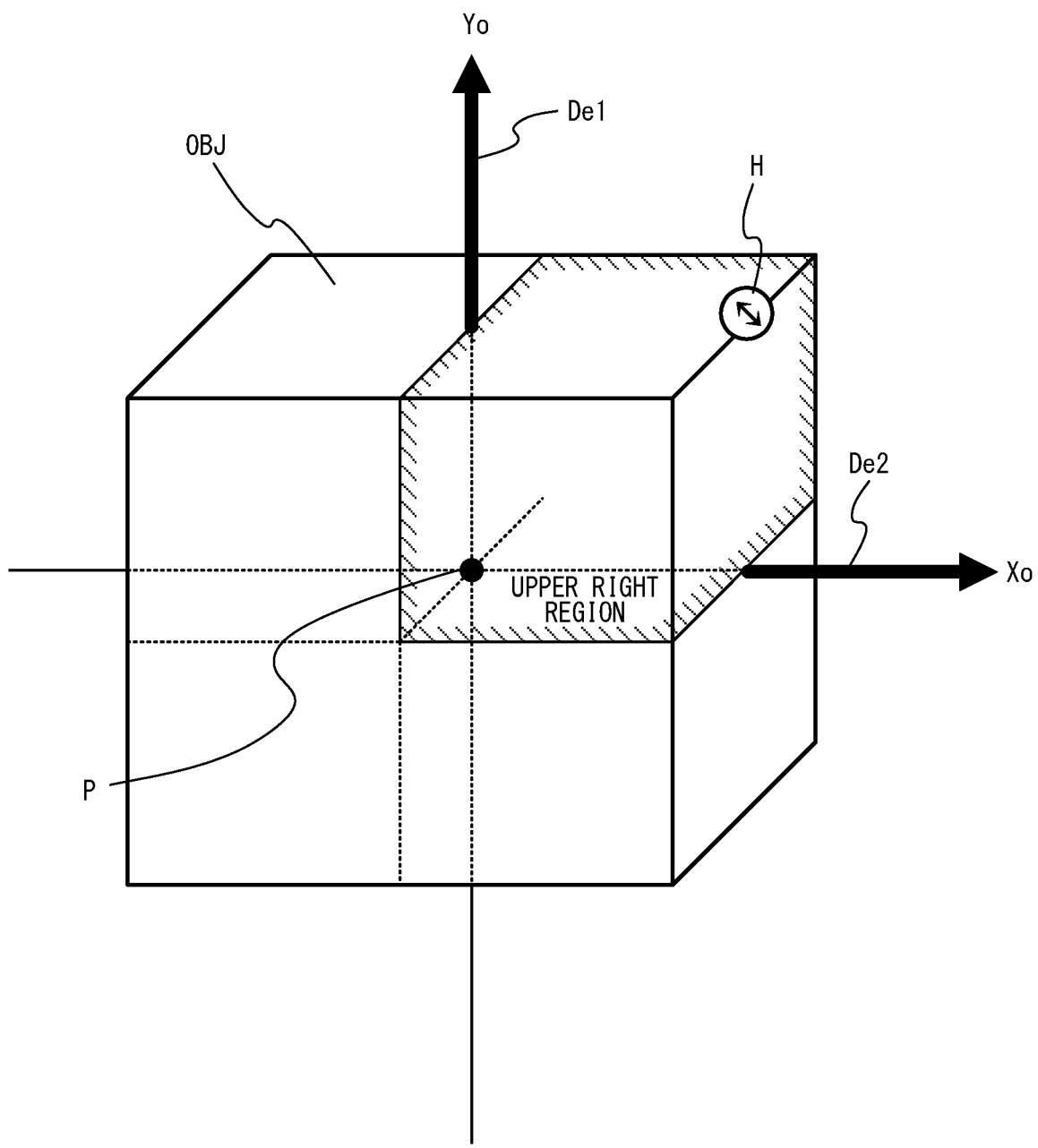
FIG. 13 is a diagram showing a non-limiting example of enlargement/reduction axes De1 and De2 in the case where a hold position H is located in an upper right region of an object OBJ.
Figure 14:
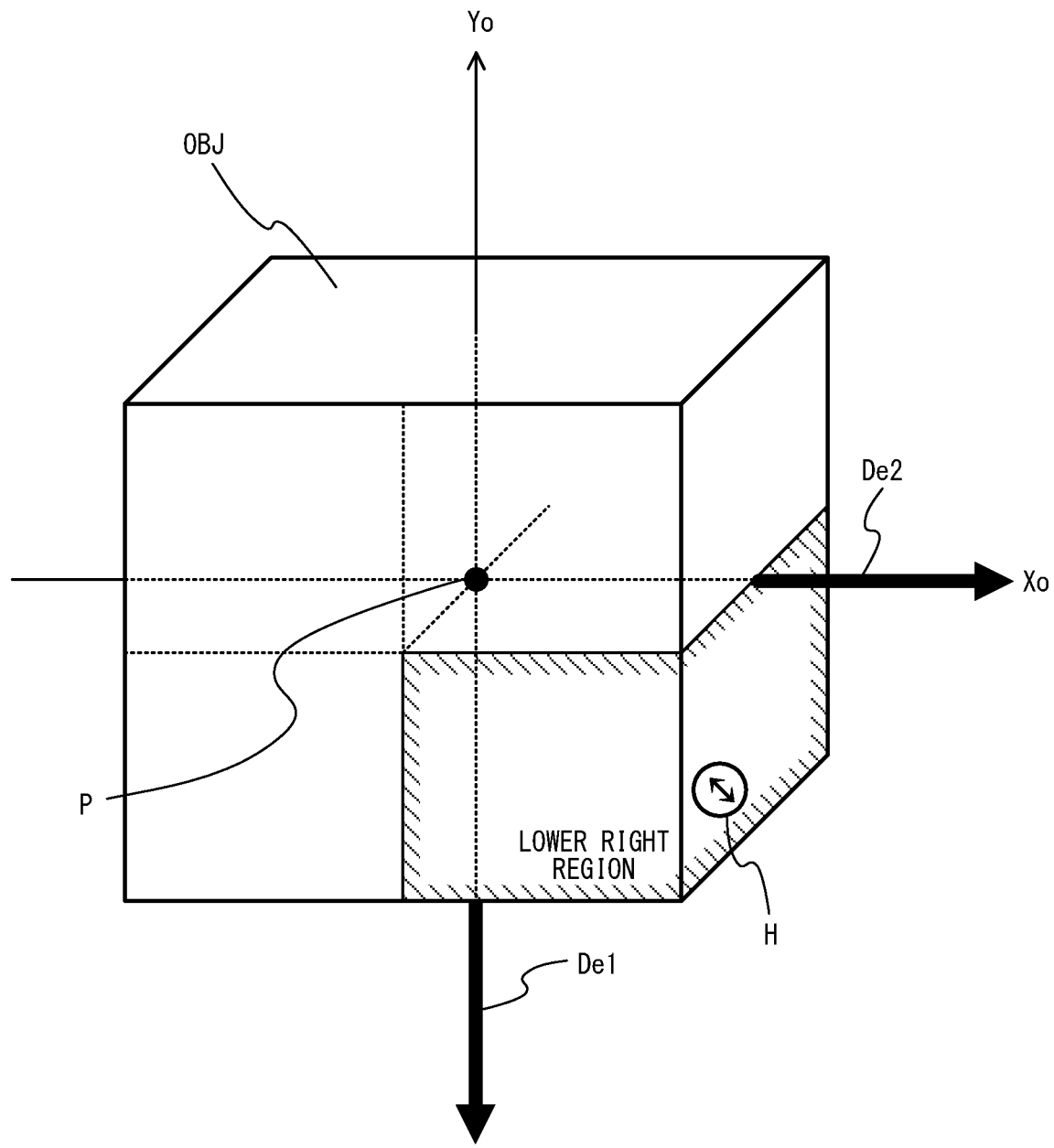
FIG. 14 is a diagram showing a non-limiting example of enlargement/reduction axes De1 and De2 in the case where a hold position H is located in a lower right region of an object OBJ.
Figure 15:
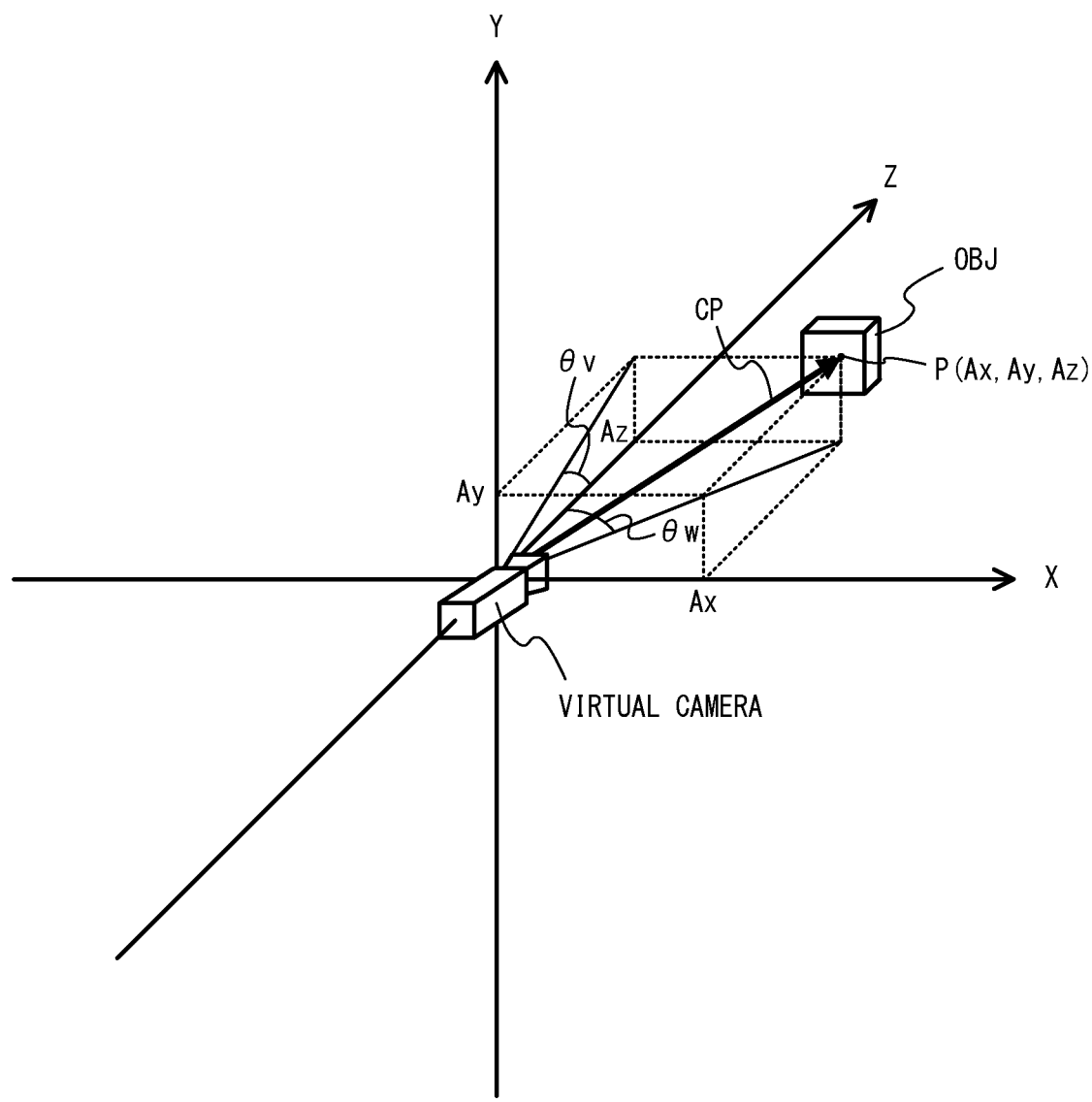
FIG. 15 is a diagram showing a non-limiting example of a direction CP pointing from the position of a virtual camera toward an object OBJ, which is used when an enlargement/reduction axis is selected.
Figure 16:
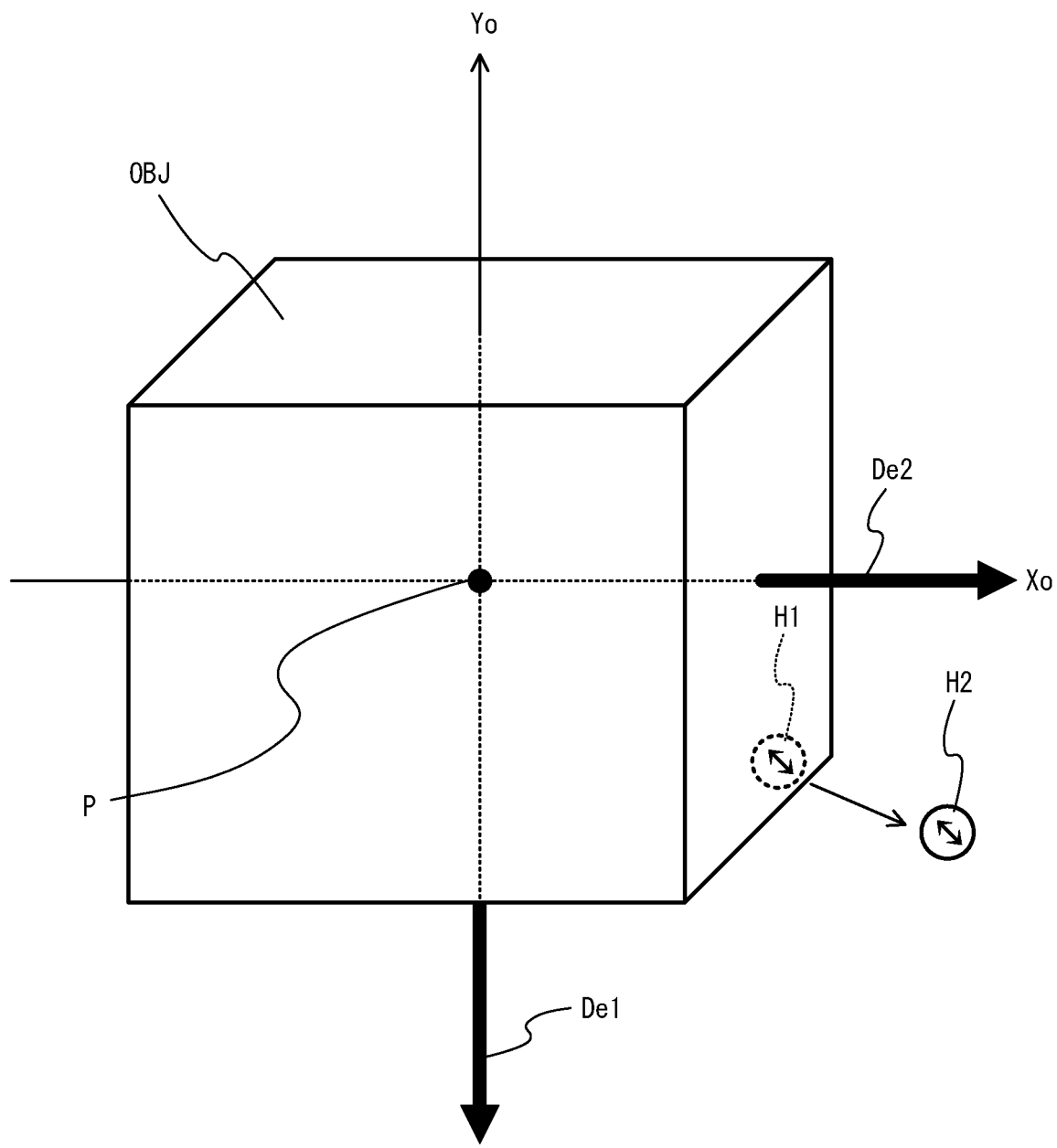
FIG. 16 is a diagram showing a non-limiting example of movement of a hold position H set for an object OBJ.
Figure 17:
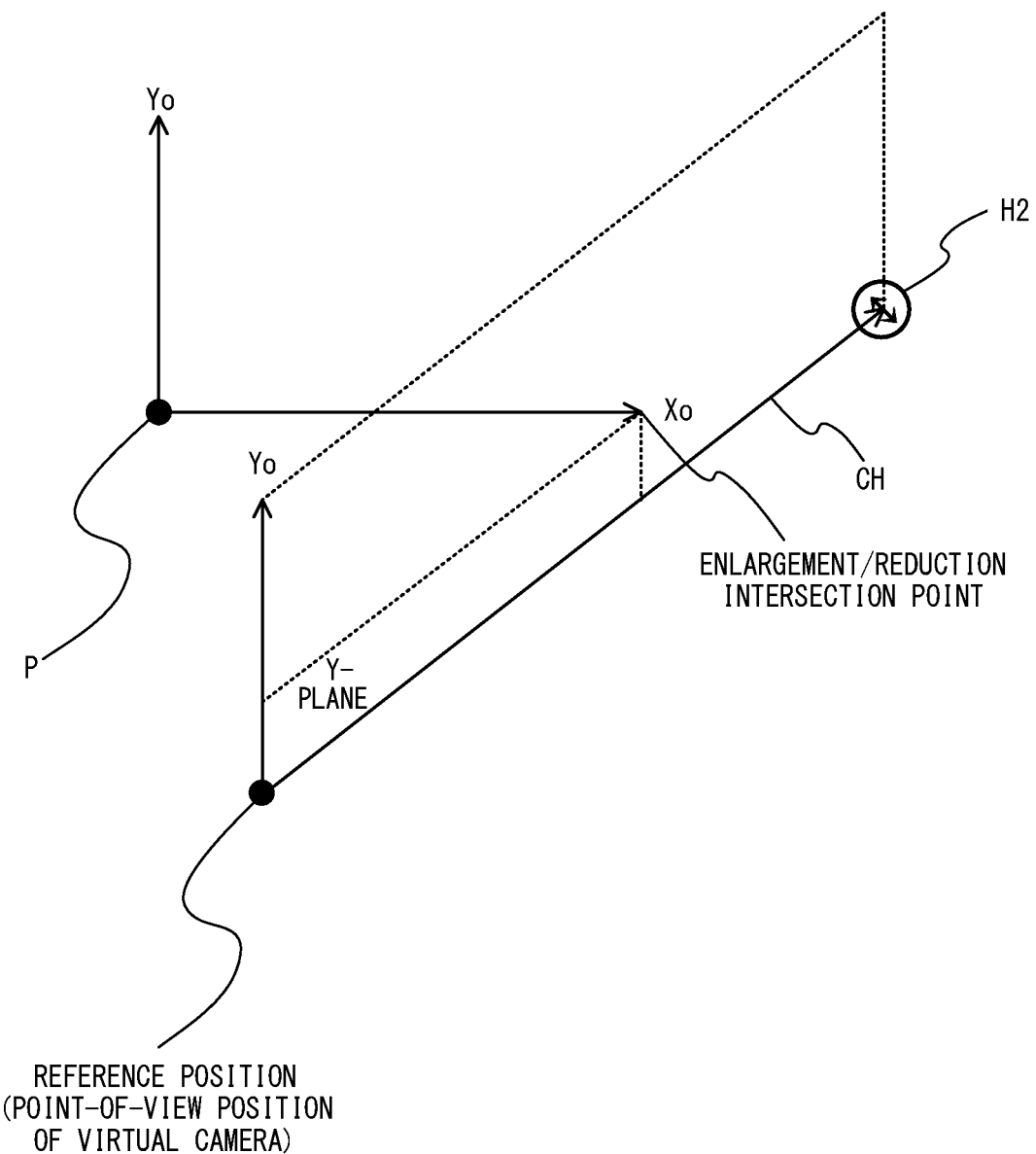
FIG. 17 is a diagram showing a non-limiting example of calculation of an enlargement/reduction amount based on a moved hold position H.
Figure 18:
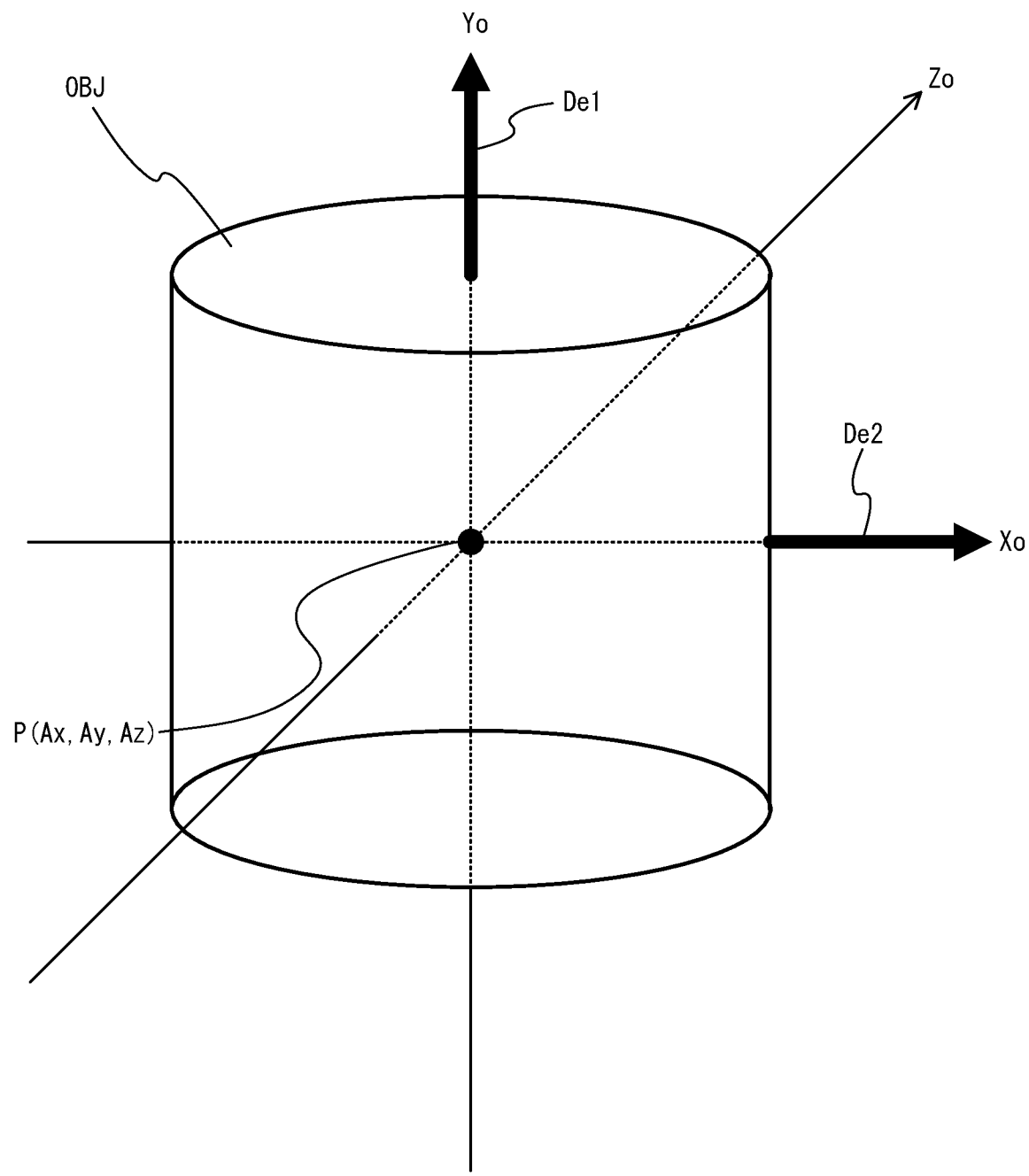
FIG. 18 is a diagram showing a non-limiting example of enlargement/reduction axes De1 and De2 set for a cylindrical object OBJ.
Figure 19:
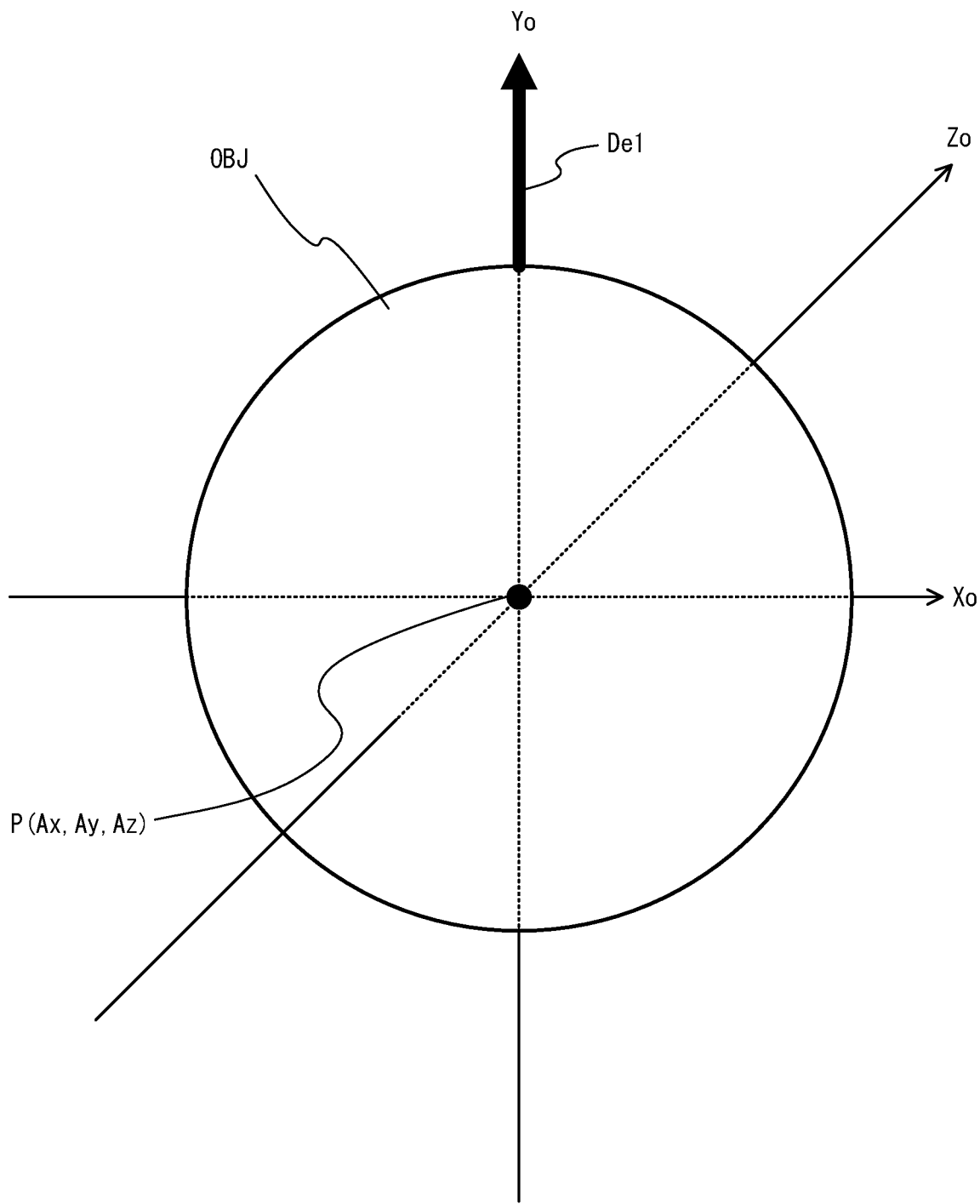
FIG. 19 is a diagram showing a non-limiting example of enlargement/reduction axes De1 and De2 set for a spherical object OBJ.

In this non-limiting example, in the case where an object is to be deformed in a virtual space, one or two enlargement/reduction axes are selected from three object axes set for the object, and an enlargement direction and a reduction direction are specified for each enlargement/reduction axis. A process of deforming an object in a virtual space will now be described with reference to FIGS. 9-19. Note that FIG. 9 is a diagram showing a non-limiting example of object axes set for a rectangular parallelepiped object OBJ. FIG. 10 is a diagram showing a non-limiting example of an enlargement direction and reduction direction of each enlargement/reduction axis. FIG. 11 is a diagram showing a non-limiting example of enlargement/reduction axes De1 and De2 in the case where a hold position H is located in an upper left region of the object OBJ. FIG. 12 is a diagram showing a non-limiting example of enlargement/reduction axes De1 and De2 in the case where a hold position H is located in a lower left region of the object OBJ. FIG. 13 is a diagram showing a non-limiting example of enlargement/reduction axes De1 and De2 in the case where a hold position H is located in an upper right region of the object OBJ. FIG. 14 is a diagram showing a non-limiting example of enlargement/reduction axes De1 and De2 in the case where a hold position H is located in a lower right region of the object OBJ. FIG. 15 is a diagram showing a non-limiting example of a direction CP pointing from the position of a virtual camera toward the object OBJ, which is used when an enlargement/reduction axis is selected. FIG. 16 is a diagram showing a non-limiting example of movement of a hold position H set for the object OBJ. FIG. 17 is a diagram showing a non-limiting example of calculation of an enlargement/reduction amount based on a moved hold position H. FIG. 18 is a diagram showing a non-limiting example of enlargement/reduction axes De1 and De2 set for a cylindrical object OBJ. FIG. 19 is a diagram showing a non-limiting example of enlargement/reduction axes De1 and De2 set for a spherical object OBJ.

In FIG. 9, three orthogonal object axes are set for each of a plurality of objects disposed in a virtual space. For example, for a rectangular parallelepiped object OBJ, three object axes Xo, Yo, and Zo are set which pass through a central position (e.g., the center-of-gravity position) P (Ax, Ay, Az) of the object OBJ in the world coordinate system of the virtual space, orthogonally intersecting with each other at the central position P. Specifically, the object axis Xo points in the direction that passes through the centers of a pair of opposite surfaces (e.g., the left and right surfaces) of the rectangular parallelepiped object OBJ and the central position P of the object OBJ. The direction from one surface to the other surface (e.g., from the left surface to the right surface) of the pair of opposite surfaces is set as the positive direction of the object axis Xo. The object axis Yo points in the direction that passes through the centers of another pair of opposite surfaces (e.g., the top and bottom surfaces) of the rectangular parallelepiped object OBJ and the central position P of the object OBJ. The direction from one surface to the other surface (e.g., from the bottom surface to the top surface) of the pair of opposite surfaces is set as the positive direction of the object axis Yo. The object axis Zo points in the direction that passes through the centers of still another pair of opposite surfaces (e.g., the front and rear surfaces) of the rectangular parallelepiped object OBJ and the central position P of the object OBJ. The direction from one surface to the other surface (e.g., from the front surface to the rear surface) of the pair of opposite surfaces is set as the positive direction of the object axis Zo. Note that the central position of an object OBJ may not be the center-of-gravity position and may be any position that serves as a reference for the object OBJ. For example, the central position of an object OBJ may be other reference positions of the object OBJ, such as a central position of a structure and an origin used in generation.

As clearly seen below, two of the three object axes Xo, Yo, and Zo thus set for the rectangular parallelepiped object OBJ are selected and set as an enlargement/reduction axis for deforming (enlarging/reducing) the object OBJ, at least based on the orientation of the object OBJ. Thereafter, based on the position (hold position) where the user takes hold of the object OBJ for deformation, an enlargement direction and a reduction direction are set for the set enlargement/reduction axes. Specifically, based on a positional relationship between a projection position obtained by projecting the hold position onto each enlargement/reduction axis and the reference position of the object OBJ (e.g., the central position P of the object OBJ where the three object axes Xo, Yo, and Zo intersect with each other), the direction from the central position P of the object OBJ toward the projection position along the enlargement/reduction axis is set as an enlargement direction, and the direction from the projection position toward the central position P of the object OBJ along the enlargement/reduction axis is set as a reduction direction. Note that the position on the object OBJ displayed and overlaid by the position (pointed position) on the display 12 pointed by the user is set as a hold position for the object OBJ. The pointed position may be pointed by a controller (the left controller 3 and/or the right controller 4).

As a non-limiting example, as shown in FIG. 10, it is assumed that two of the three object axes Xo, Yo, and Zo, e.g., the object axes Xo and Yo, are set as an enlargement/reduction axis, and a hold position is set at a position located in the negative direction of the axis Xo and in the positive direction of the axis Yo with respect to the central position P. In such a case, a positional relationship between an intersection point Xh obtained by projecting the hold position perpendicularly onto the axis Xo and the central position P is such that the intersection point Xh is located in the negative direction of the axis Xo with respect to the central position P. Therefore, in the case of the axis Xo, which is one of the enlargement/reduction axes, the direction pointing from the central position P toward the intersection point Xh, i.e., the negative direction of the axis Xo, is the enlargement direction of the enlargement/reduction axis Xo, and the opposite direction (i.e., the positive direction) of the axis Xo is the reduction direction of the enlargement/reduction axis Xo. When the hold position is moved in the enlargement direction of the enlargement/reduction axis Xo, the object OBJ is enlarged in the enlargement direction. When the hold position is moved in the reduction direction of the enlargement/reduction axis Xo, the object OBJ is reduced in the reduction direction. A positional relationship between an intersection point Yh obtained by projecting the hold position perpendicularly onto the axis Yo and the central position P is such that the intersection point Yh is located in the positive direction of the axis Yo with respect to the central position P. Therefore, in the case of the axis Yo, which is the other of the enlargement/reduction axes, the direction pointing from the central position P toward the intersection point Yh, i.e., the positive direction of the axis Yo, is the enlargement direction of the enlargement/reduction axis Yo, and the opposite direction (i.e., the negative direction) of the axis Yo is the reduction direction of the enlargement/reduction axis Yo. When the hold position is moved in the enlargement direction of the enlargement/reduction axis Yo, the object OBJ is enlarged in the enlargement direction. When the hold position is moved in the reduction direction of the enlargement/reduction axis Yo, the object OBJ is reduced in the reduction direction.

Note that the three object axes Xo, Yo, and Zo may not intersect at a single point, or may not intersect at the reference point (central position P) of the object OBJ. The projection position may not be such that the hold position is projected exactly perpendicularly onto an enlargement/reduction axis, and may be a position obtained by projection onto an enlargement/reduction axis according to a predetermined relationship.

Based on the above process, as shown in, for example, FIGS. 11-14, surfaces (in the example of FIG. 11, the front surface, the right surface, and the top surface) of the rectangular parallelepiped object OBJ seen from the virtual camera disposed in the virtual space are virtually divided into four regions, and an enlargement direction and reduction direction for the object OBJ are set based on the region where the hold position provided by the user's operation is located. For example, the regions are four portions obtained by equally dividing the object OBJ with reference to the center thereof by two planes (a first plane and a second plane). Specifically, the first plane dividing the object OBJ includes one of the three object axes Xo, Yo, and Zo set as one of the enlargement/reduction axes, one of the three object axes Xo, Yo, and Zo not set as an enlargement/reduction axis, and the central position P of the object OBJ. The second plane dividing the object OBJ includes one of the three object axes Xo, Yo, and Zo set as the other enlargement/reduction axis, one of the three object axes Xo, Yo, and Zo not set as an enlargement/reduction axis, and the central position P of the object OBJ. The regions include an upper left region, lower left region, upper right region, and lower right region separated by the first and second planes.

As shown in FIG. 11, it is assumed that a hold position is set in the upper left region of the rectangular parallelepiped object OBJ with the object axes Xo and Yo of the object OBJ set as an enlargement/reduction axis. In this case, for the two set enlargement/reduction axes, the direction thereof toward an upper left region as seen from the central position P of the object OBJ is the direction in which the object OBJ is to be enlarged. For example, in the non-limiting example of FIG. 11, in the case where a hold position is set in the upper left region of the object OBJ, for which the object axes Xo and Yo are set as an enlargement/reduction axis, the positive direction of the object axis Yo is an enlargement direction, and the negative direction of the object axis Xo is an enlargement direction. In order to show the user the directions in which the object OBJ is to be enlarged, the positive direction of the object axis Yo is represented by a first enlargement direction image De1, and the negative direction of the object axis Xo is represented by a second enlargement direction image De2. As a non-limiting example, the first and second enlargement direction images De1 and De2 are each in the shape of an arrow extending outward from the intersection point between the corresponding enlargement/reduction axis and the corresponding surface of the object OBJ.

For example, if the hold position H is moved in the directions indicated by the first and second enlargement direction images De1 and De2, the object OBJ is enlarged in the directions indicated by the first and second enlargement direction images De1 and De2. In addition, if an operation of moving the hold position H in the directions opposite to the directions indicated by the first and second enlargement direction images De1 and De2, the object OBJ is reduced in the directions opposite to the directions indicated by the first and second enlargement direction images De1 and De2. Specifically, if an operation of moving the hold position H in the direction indicated by the first enlargement direction image De1 is performed, the object OBJ is enlarged both in the direction indicated by the first enlargement direction image De1 and in the direction opposite to the direction indicated by the first enlargement direction image De1, where the central position P of the object OBJ is the center.

As can be clearly seen from FIG. 11, in the case where the hold position H is set in the upper left region of the rectangular parallelepiped object OBJ, the state that the hold position H is set on the front surface of the object OBJ, which extends in the directions of the two set enlargement/reduction axes (i.e., the directions of the object axes Xo and Yo), and the state that the hold position H is set on the top surface of the object OBJ, which does not extend in one of the directions of the two enlargement/reduction axes (i.e., perpendicular to the direction of the object axis Yo). Thus, no matter which of the surfaces of the object OBJ having different directions the hold position H is set, the object OBJ is enlarged or reduced in the same two enlargement/reduction axis directions. That is, even in the case where the hold position H is set on a surface of the rectangular parallelepiped object OBJ which is adjacent to the surface of the rectangular parallelepiped object OBJ extending the directions of the two determined enlargement/reduction axes, the object OBJ is enlarged or reduced in the directions of the two enlargement/reduction axes.

As shown in FIG. 12, it is assumed that a hold position is set in the lower left region of a rectangular parallelepiped object OBJ with the object axes Xo and Yo of the object OBJ set as an enlargement/reduction axis. In this case, the direction of each of the two set enlargement/reduction axes which points toward a lower left region as seen from the central position P of the object OBJ is set as a direction in which the object OBJ is to be enlarged. For example, in the non-limiting example of FIG. 12, in the case where a hold position is set in the lower left region of the object OBJ, for which the object axes Xo and Yo are set as an enlargement/reduction axis, the negative direction of the object axis Yo is an enlargement direction, and the negative direction of the object axis Xo is an enlargement direction. To show the user the directions in which the object OBJ is to be enlarged, the negative direction of the object axis Yo is represented by a first enlargement direction image De1, and the negative direction of the object axis Xo is represented by a second enlargement direction image De2.

As shown in FIG. 13, it is assumed that a hold position is set in the upper right region of a rectangular parallelepiped object OBJ with the object axes Xo and Yo of the object OBJ set as an enlargement/reduction axis. In this case, the direction of each of the two set enlargement/reduction axes which points toward an upper right region as seen from the central position P of the object OBJ is set as a direction in which the object OBJ is to be enlarged. For example, in the non-limiting example of FIG. 13, in the case where a hold position is set in the upper right region of the object OBJ, for which the object axes Xo and Yo are set as an enlargement/reduction axis, the positive direction of the object axis Yo is an enlargement direction, and the positive direction of the object axis Xo is an enlargement direction. To show the user the directions in which the object OBJ is to be enlarged, the positive direction of the object axis Yo is represented by a first enlargement direction image De1, and the positive direction of the object axis Xo is represented by a second enlargement direction image De2.

As shown in FIG. 14, it is assumed that a hold position is set in the lower right region of a rectangular parallelepiped object OBJ with the object axes Xo and Yo of the object OBJ set as an enlargement/reduction axis. In this case, the direction of each of the two set enlargement/reduction axes which points toward a lower right region as seen from the central position P of the object OBJ is set as a direction in which the object OBJ is to be enlarged. For example, in the non-limiting example of FIG. 14, in the case where a hold position is set in the lower right region of the object OBJ, for which the object axes Xo and Yo are set as an enlargement/reduction axis, the negative direction of the object axis Yo is an enlargement direction, and the positive direction of the object axis Xo is an enlargement direction. To show the user the directions in which the object OBJ is to be enlarged, the negative direction of the object axis Yo is represented by a first enlargement direction image De1, and the positive direction of the object axis Xo is represented by a second enlargement direction image De2.

Next, a non-limiting example process of selecting two of the three object axes as an enlargement/reduction axis will be described with reference to FIG. 15. As the first stage of the process, based on the position of the virtual camera and the position of an object OBJ in the virtual space, two are selected from three orthogonal world coordinate axes that are an X-axis pointing in horizontal leftward and rightward directions in the virtual space, a Y-axis pointing in vertical upward and downward directions in the virtual space, and a Z-axis pointing in horizontal forward and rearward directions in the virtual space. For example, as shown in FIG. 15, a direction CP is calculated which points from the position (point-of-view position) of the virtual camera in the virtual space toward the central position P of the object OBJ as an object to be operated. In the case where the angle of elevation or angle of depression (an angle of $\theta v$ in the vertical direction in the world coordinate system) of the direction CP in the virtual space is greater than or equal to a threshold (e.g., greater than or equal to 60°), the X- and Z-axes which are a world coordinate axis are selected. In the case where the horizontal azimuthal angle (an angle of $\theta w$ in the horizontal direction in the world coordinate system) of the direction CP in the virtual space is within a predetermined angular range (e.g., within 45°) about the Z-axis direction, the X- and the Y-axes which are a world coordinate axis are selected. In the case where the angles of the direction CP do not satisfy any condition, the Y- and Z-axes which are a world coordinate axis are selected.

As the second stage of the process, two object axes that are closer to the two selected world coordinate axes are selected from the three object axes of the object OBJ as an enlargement/reduction axis. For example, three object axes are indicated by Xo, Yo, and Zo, and the two selected world coordinate axes are indicated by A and B. One of the object axes Xo, Yo, and Zo that is closest to the direction of the world coordinate axis A is denoted as an axis "a", and one of the object axes Xo, Yo, and Zo excluding the axis "a" that is closest to the world coordinate axis B is denoted as an axis "b". The object axes "a" and "b" are set as an enlargement/reduction axis for the object OBJ.

Note that in the above non-limiting example process, two are selected from the three world coordinate axes based on the position of an object OBJ with respect to the virtual camera, and two are selected from the three object axes based on the orientation of the object OBJ in the virtual space and the two world coordinate axes, and are set as an enlargement/reduction axis for the object OBJ. However, other methods may be used to set two of the three object axes as an enlargement/reduction axis.

As a first non-limiting example, a screen coordinate system is set in which three screen coordinate axes (e.g., a virtual camera line-of-sight direction axis, virtual camera leftward/rightward axis, and virtual camera upward/downward axis, which are orthogonal to each other) are specified with reference to the position and orientation of the virtual camera in the virtual space. Thereafter, from the three screen coordinate axes, two screen coordinate axes (i.e., the virtual camera leftward/rightward axis and the virtual camera upward/downward axis) excluding the virtual camera line-of-sight direction axis are selected, and two object axes which are closer to the two screen coordinate axes are selected as an enlargement/reduction axis. For example, the three object axes are indicated by Xo, Yo, and Zo, and the two selected screen coordinate axes are indicated by C and D. One of the object axes Xo, Yo, and Zo that is closest to the direction of the screen coordinate axis C is denoted as an axis "c", and one of the object axes Xo, Yo, and Zo excluding the axis "c" that is closest the screen coordinate axis D is denoted as an axis "d". The object axes "c" and "d" are set as an enlargement/reduction axis for the object OBJ.

As a second non-limiting example, two object axes that have the smallest differential angle with respect to a screen plane (i.e., a plane parallel to both the virtual camera leftward/rightward axis and the virtual camera upward/downward axis) in the screen coordinate system are selected as an enlargement/reduction axis. For example, the three object axes are indicated by Xo, Yo, and Zo. One of the object axes Xo, Yo, and Zo that has the smallest differential angle with respect to the screen plane is denoted as an axis "e", and one of the object axes Xo, Yo, and Zo excluding the axis "e" that has the smallest differential angle is denoted as an axis "f". The object axes "e" and "f" are set as an enlargement/reduction axis for the object OBJ.

As a third non-limiting example, two object axes that have the greatest differential angle with respect to the light-of-sight direction of the virtual camera in the virtual space are selected as an enlargement/reduction axis. For example, the three object axes are indicated by Xo, Yo, and Zo. One of the object axes Xo, Yo, and Zo that has the greatest differential angle with respect to the line-of-sight direction of the virtual camera is denoted as an axis "g" and one of the object axes Xo, Yo, and Zo excluding the axis "g" that has the greatest differential angle with respect to the line-of-sight direction is denoted as an axis "h". The object axes "g" and "h" are set as an enlargement/reduction axis for the object OBJ.

Next, a non-limiting example process of calculating an amount in which an object OBJ is to be enlarged or reduced according to the movement of a hold position H will be described with reference to FIGS. 16 and 17. For example, in the above process, the intersection point between the plane including the direction connecting the virtual camera and the hold position H and the direction pointing from the virtual camera along one (first one) of the two enlargement/reduction axes, and the direction pointing from the central position P of the object OBJ along the other (second) enlargement/reduction axis, is set as an enlargement/reduction intersection point. The amount of enlargement or reduction of the object OBJ along the second enlargement/reduction axis is calculated based on the amount of movement of the enlargement/reduction intersection point that is moved according to the movement of the hold position H in the virtual space. Note that as described above, the hold position H is located on the object OBJ that is displayed and overlaid by a position (pointed position) on the display 12 which is an aiming position pointed by the user. Therefore, the direction pointing from the reference position (virtual camera point-of-view position) toward the hold position H (direction CH shown in FIG. 17) is an aiming direction connecting the virtual camera in the virtual space and the position in the virtual space corresponding to the pointed position.

For example, as shown in FIG. 16, it is assumed that in the case where the object axes Xo and Yo of a rectangular parallelepiped object OBJ are set as an enlargement/reduction axis, a hold position is moved from a hold position H1 to a hold position H2 in the lower right region of the object OBJ. Here, the movement from the hold position H1 to the hold position H2 is performed in the negative direction of the object axis Yo, which is one (first one) of the enlargement/reduction axes, and in the positive direction of the object axis Xo, which is the other (second) enlargement/reduction axis. Therefore, this is an operation of enlarging the object OBJ in the negative direction of the object axis Yo and enlarging the object OBJ in the positive direction of the object axis Xo. Thus, in this non-limiting example, the enlargement/reduction operation directions of the user's operation are associated with the directions of two enlargement/reduction axes.

FIG. 17 shows a non-limiting example method for calculating the amount of enlargement of an object OBJ that is enlarged in the direction pointed by the object axis Xo, which is the second enlargement/reduction axis, when the hold position is moved from the hold position H1 to the hold position H2 as described above. For example, the amount of enlargement of the object OBJ in the direction pointed by the object axis Xo is calculated using the amount of movement of an enlargement/reduction intersection point that is the intersection point between the plane (Y-plane shown in FIG. 17) including the direction pointing from a reference position (virtual camera point-of-view position) toward the hold position H2 (direction CH of FIG. 17) and the direction pointing from the reference position along one (first one) of the enlargement/reduction axes (i.e., the object axis Yo), and the direction pointing from the central position P of the object OBJ along the other (second) enlargement/reduction axis (i.e., the object axis Xo). In addition, the amount of enlargement of the object OBJ in the direction pointed by the object axis Yo is calculated using the amount of movement of an enlargement/reduction intersection point that is the intersection point between the X-plane including the direction pointing from the reference position (virtual camera point-of-view position) toward the hold position H2 and the direction pointing from the reference position along the second enlargement/reduction axis (i.e., the object axis Xo), and the direction pointing from the central position P of the object OBJ along the first enlargement/reduction axis (i.e., the object axis Yo).

For example, the amount of enlargement of the object OBJ is calculated based on the difference between an enlargement/reduction intersection point calculated based on the hold position H1 set in the previous process, and an enlargement/reduction intersection point calculated based on the hold position H2 set in the current process. As a non-limiting example, the amount of enlargement of the object OBJ is calculated by:

$$s(n)=s(n-1)+(d(n)-d(n-1))$$

where s(n) represents the size of the object OBJ, and d(n) represents the distance between the central position P and the enlargement/reduction intersection point. As another non-limiting example, the amount of enlargement of the object OBJ is calculated by:

$$s(n)=s(n-1)+(d(n)-d(n-1))*(s(n-1)/d(n-1))$$

Note that an upper limit value and a lower limit value may be set for the size s(n) of the object OBJ. As another non-limiting example, an upper limit value may be set for the amount of enlargement of the object OBJ, and a lower limit value may be set for the amount of reduction of the object OBJ. For example, in the case where an upper limit value is set for the size s(n) of the object OBJ, even when the calculated size s(n) exceeds the upper limit value, the size s(n) is set to the upper limit value (i.e., the amount of enlargement=0), and then the object OBJ is enlarged. After an operation of moving the hold position is thus performed so as to enlarge the object OBJ so that the size s(n) of the object OBJ exceeds the upper limit value, if the hold position is moved in the opposite direction, the object OBJ is reduced, i.e., an operation of reducing the object OBJ is performed. Here, the reduction of the object OBJ may be started in response to the reduction operation at the time point that the size s(n) becomes less than the upper limit value due to the above method, or immediately after the reduction operation is performed, i.e., a switching time point. Note that "reduction is started immediately after the switching time point" may include not only the case where reduction is started exactly immediately after the switching time point, but also the case where reduction is started after a predetermined non-response period (play period) has passed since the switching time point.

In addition, in the case where a lower limit value is set for the size s(n) of the object OBJ, even if the calculated size s(n) is smaller than the lower limit value, the size s(n) may be set to the lower limit value (i.e., the amount of reduction=0), and then the object OBJ may be reduced. In addition, in the case where the calculated size s(n) is smaller than the lower limit value, the operation may be switched to an operation of enlarging the object OBJ at the time point that the size s(n) smaller than the lower limit value is calculated. For example, in the case where the lower limit value of the object OBJ is set to the size s(n)=0, when the hold position H is moved in the reduction direction to a position beyond the central position P of the object OBJ (e.g., the hold position H is moved into another region of the four divided regions), the calculated size s(n) is smaller than the lower limit value. At the time point that the size s(n) smaller than the lower limit value is thus calculated, enlargement/reduction can be reversed by replacing the process of reduction by the amount of reduction with the process of enlargement by the amount of reduction.

More specifically, it is assumed that the object OBJ is reduced in a first reduction direction in response to the user's operation input in a first direction, and the object OBJ is enlarged in a first enlargement direction opposite to the first reduction direction in response to the user's operation input in a second direction. In that case, if the user's operation input in the first direction is continued after the object OBJ is reduced in the first reduction direction to the lower limit value in response to the user's operation input in the first direction, the object OBJ is enlarged in the first enlargement direction after the object OBJ reaches the lower limit value. When the user's operation input in the second direction is performed after the object OBJ reaches the lower limit value and then is enlarged in the first enlargement direction, the object OBJ is reduced in the first reduction direction.

In addition, when the hold position H is moved into the outside of the display range of the display 12 during the operation of deforming the object OBJ, the process of changing the amount of enlargement or the amount of reduction may be stopped at the time point that the hold position H is moved into the outside of the display range (i.e., the object OBJ is maintained at the size as it is immediately before the hold position H is moved into the outside of the display range). In that case, the calculation of the amount of enlargement or the amount of reduction may be resumed based on the hold position H located at the time point that the hold position H is returned into the display range of the display 12.

In addition, when an operation of deforming the object OBJ is performed, the object OBJ may overlap another object (may enter another object). At that time, even after a process of deforming the object OBJ is continued with the object OBJ maintained overlapping the second object, the overlapping state with the second object may be maintained. Alternatively, the second object overlapping the object OBJ may be moved out of the range of the object OBJ during deformation.

In addition, when an operation of deforming the object OBJ is performed, the object OBJ may overlap a field surface set in the virtual space (may enter below the field). At that time, the deformed object OBJ may be moved to above the field surface after the deforming process is continued with the overlapping state with the field surface maintained and then the deforming process is ended (i.e., after the holding operation is ended). Alternatively, further deformation of the object OBJ may be stopped at the time point that the object OBJ comes into contact with the field surface during deformation.

Note that even in the case where the maintenance of the overlapping state of the deformed object OBJ and the field surface is not permitted (i.e., after the process of deforming the object OBJ is ended, the deformed object OBJ is moved to above the field surface so that the object OBJ does not overlap the field surface), overlapping between the object OBJ and another object may be permitted. In other words, when the object OBJ and the field surface overlap at the end of the process of deforming the object OBJ, then even if the process of moving the object OBJ to above the field surface is performed, so that the moved object OBJ overlaps another object, that overlapping may be maintained. As a result, the difficulty in predicting the final destination of the object OBJ in the case where after the object OBJ is moved so as to avoid overlapping the field surface, the object OBJ is moved again so as to avoid overlapping still another object, and therefore, can be eliminated or reduced.

Incidentally, the object OBJ can be not only deformed but also moved in a virtual space by the user's operation, and at that time, the object OBJ may be forbidden to be moved so as to overlap the field surface. Specifically, the object OBJ may be set so that the object OBJ cannot be moved to enter below the field surface. Likewise, the object OBJ can be set so that the object OBJ cannot be moved so as to overlap another object (enter another object). Note that when the object OBJ is maintained overlapping another object at the time point that the deformation process has been ended, the object OBJ may be permitted to overlap that second object in the process of moving the object OBJ. However, once overlapping between the object OBJ and the second object has been eliminated (after overlapping is eliminated during the movement process and/or after overlapping is eliminated at the time point that the movement process is ended), the object OBJ may be set so that the object OBJ cannot be moved so as to overlap the second object. Although the field surface is illustrated in the above description, the present technology is not limited to this, and a ceiling surface or a wall surface may be set similarly, for example. Alternatively, a boundary for defining a preferable specific space for disposing an object OBJ in a virtual space may be set similarly.

In addition, the object OBJ may be enlarged or reduced by calculating an intended enlarged or reduced size based on the enlargement/reduction intersection point. For example, the intended size of the object OBJ when enlarged in the direction pointed by the object axis Xo is calculated based on the distance on the enlargement/reduction axis Xo between the central position P of the object OBJ and the enlargement/reduction intersection point of the Y-plane. In addition, the intended size of the object OBJ when enlarged in the direction pointed by the object axis Yo is calculated based on the distance on the enlargement/reduction axis Yo between the central position P of the object OBJ and the enlargement/reduction intersection point of the X-plane.

In addition, as a non-limiting example, in the case where at least one of the position of the object OBJ, the orientation of the object OBJ, the position of the virtual camera, and the orientation of the virtual camera is changed during an operation of deforming the object OBJ, a parameter for enlarging or reducing the object OBJ may be calculated by changing any of the enlargement/reduction axes, enlargement direction, central position, etc., of the object OBJ, depending on the states of the object OBJ and/or the virtual camera after being changed. As another non-limiting example, even when at least one of the position of the object OBJ, the orientation of the object OBJ, the position of the virtual camera, and the orientation of the virtual camera is changed during an operation of deforming the object OBJ, the process of enlarging or reducing the object OBJ may be continued using the states of the object OBJ and/or the virtual camera before being changed.

In the foregoing, it is assumed that the object OBJ is deformed (enlarged/reduced) in the directions pointed by two enlargement/reduction axes selected from the three object axes. Alternatively, the way of deforming an object OBJ may vary depending on the shape thereof. For example, in the case where an object OBJ has a shape including a curved surface, the object OBJ may be deformed in a way different from that for a rectangular parallelepiped shape.

For example, as shown in FIG. 18, in the case where a cylindrical object OBJ is deformed, the object OBJ may be enlarged or reduced with the shape of the circular surface maintained. For example, as shown in FIG. 18, it is assumed that an object axis (object axis Yo shown in FIG. 18) of an object OBJ extending in the direction pointed by the cylindrical axis of the cylindrical shape, and one (object axis Xo shown in FIG. 18) of the object axes perpendicular to the cylindrical axis direction, are set as an enlargement/reduction axis. For such two enlargement/reduction axes, when an operation of enlarging or reducing the object OBJ in the cylindrical axis direction of the cylindrical shape set as an enlargement/reduction axis direction is performed, the object OBJ is enlarged or reduced in the cylindrical axis direction with the size and shape of the cylindrical surface (the top and bottom surface shown in FIG. 18) maintained. Meanwhile, when an operation of enlarging or reducing the object OBJ in the direction pointed by one of the object axes perpendicular to the cylindrical axis direction, the object OBJ is deformed so that the size of the cylindrical surface is enlarged or reduced with the shape of the cylindrical surface maintained. Thus, even when an operation of enlarging or reducing the object OBJ is performed with one (e.g., the object axis Xo) of the object axes perpendicular to the cylindrical axis direction of the cylindrical shape set as an enlargement/reduction axis, the object OBJ is also enlarged or reduced in the direction pointed by the other object axis (e.g., the object axis Zo) perpendicular to the cylindrical axis direction in association with that enlargement or reduction, so that the object OBJ is enlarged or reduced with the shape of the cylindrical surface maintained without being deformed into an elliptical shape.

In addition, as shown in FIG. 19, in the case where a spherical object OBJ is deformed, the object OBJ may be enlarged or reduced so that the size thereof is enlarged or reduced with the spherical shape maintained. In that case, even when the spherical object OBJ is enlarged or reduced in any direction, the same result is obtained from the deformation. Therefore, as shown in FIG. 19, a single enlargement/reduction axis (e.g., the object axis Yo) may be set for the spherical object OBJ. Thus, when an operation of enlarging or reducing a spherical object OBJ in a single enlargement/reduction axis direction set for the object OBJ, the object OBJ is deformed so that the spherical size thereof is enlarged or reduced with the spherical shape maintained. Thus, even when an operation of enlarging or reducing a spherical object OBJ is performed with one object axis thereof (e.g., the object axis Yo) set as an enlargement/reduction axis, the object OBJ is also enlarged or reduced in the directions pointed by the two other object axes (e.g., the object axes Xo and Zo) in addition to that object axis in association with that enlargement or reduction, so that the object OBJ is enlarged or reduced with the spherical shape maintained without being deformed into an elliptical shape.

Note that the world coordinate axes and the object axes that are used to set an enlargement/reduction axis for deforming an object OBJ are fixed in the virtual space, i.e., are not changed, even when the orientation of the virtual camera is changed in the virtual space. Thus, a direction in which the object OBJ is deformed is not changed, even when the orientation of the virtual camera is changed, and therefore, the object OBJ can be deformed in a stable direction.

In addition, the above non-limiting example is applicable to the case where images allowing stereopsis are displayed. For example, the left eye's image and the right eye's image having a parallax for allowing stereopsis of a virtual space are displayed in a left region and a right region, respectively, of the display 12. The left eye's image and the right eye's image displayed on the display 12 are seen by the user's left and right eyes using a goggles device which, when attached to the main body apparatus 2, allows the user to see the left eye's image displayed in the left region through the left eye's lens, and allows the user to see the right eye's image displayed in the right region through the right eye's lens. Thus, an image of the virtual space allowing stereopsis can be displayed. Therefore, even in the case where a virtual space image allowing stereopsis is displayed on the display 12, a process of deforming an object to be operated can be similarly achieved by similarly setting an enlargement/reduction axis in a virtual space for the object with reference to a pair of the left eye's virtual camera and the right eye's virtual camera set in the virtual space. Note that in the case where an image allowing stereopsis is seen using a goggles device with the main body apparatus 2 attached thereto, the orientation of the virtual camera may be controlled according to the orientation of the main body apparatus 2 or the orientation of the goggles device. If data detected by an inertial sensor (the acceleration sensor 89 and/or the angular velocity sensor 90) provided in the main body apparatus 2 is used, not only the orientation of the main body apparatus 2 but also the orientation of the goggles device can, of course, be calculated. In addition, in the case where a goggles device having a display screen and an inertial sensor is used, the above virtual space image allowing stereopsis may be displayed on the display screen. In that case, the orientation of the virtual camera may be controlled based on detection performed by the inertial sensor provided in the goggles device.

Figure 20:
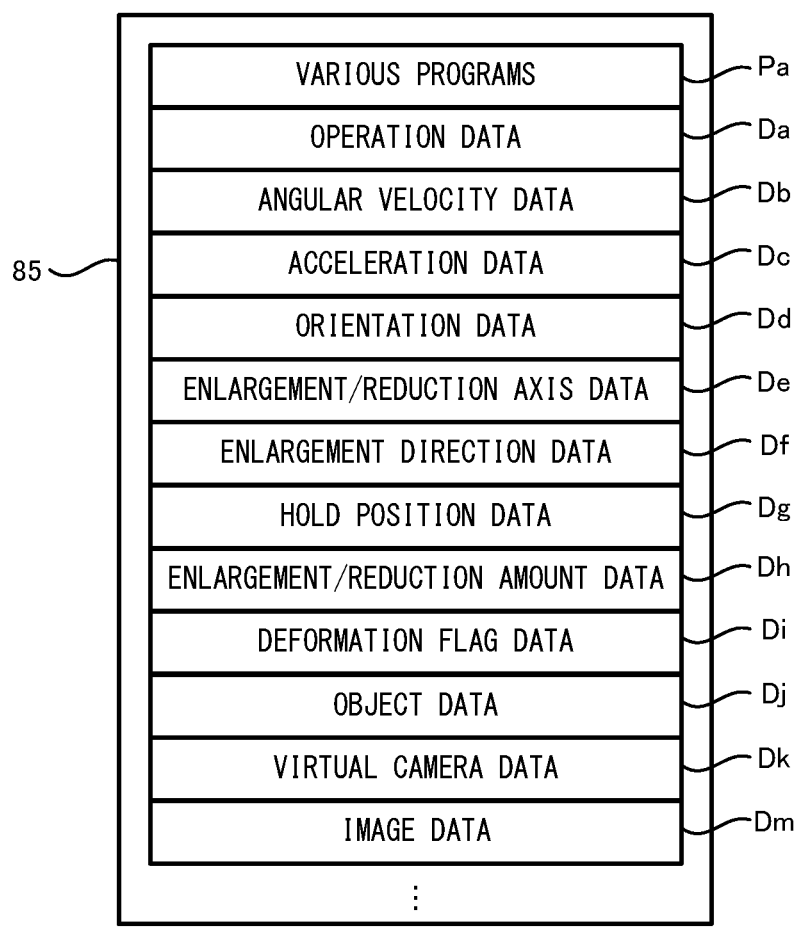
FIG. 20 is a diagram showing a non-limiting example of a data area contained in a DRAM 85 of the main body apparatus 2 in this non-limiting example.

Next, a non-limiting example of a specific process executed by the game system 1 in this non-limiting example will be described with reference to FIGS. 20-22. FIG. 20 is a diagram showing a non-limiting example of a data area contained in the DRAM 85 of the main body apparatus 2 in this non-limiting example. Note that in addition to the data of FIG. 20, the DRAM 85 also stores data used in other processes, which will not be described in detail.

Various programs Pa that are executed in the game system 1 are stored in a program storage area of the DRAM 85. In this non-limiting example, the programs Pa include a communication program for performing wireless communication with the left controller 3 and/or the right controller 4, an application program (e.g., an editor for generating and editing a virtual space, or a game program) for performing information processing based on data obtained from the left controller 3 and/or the right controller 4, and the orientation of the main body apparatus 2, etc. Note that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus through a network, such as the Internet, and then stored in the DRAM 85. The processor 81 executes the programs Pa stored in the DRAM 85.

Various kinds of data that are used in processes such as a communication process and an information process that are executed in the game system 1 are stored in a data storage area of the DRAM 85. In this non-limiting example, the DRAM 85 stores operation data Da, angular velocity data Db, acceleration data Dc, orientation data Dd, enlargement/reduction axis data De, enlargement direction data Df, hold position data Dg, enlargement/reduction amount data Dh, deformation flag data Di, object data Dj, virtual camera data Dk, and image data Dm, etc.

The operation data Da is obtained from the left controller 3 and/or the right controller 4 as appropriate. As described above, the operation data transmitted from the left controller 3 and/or the right controller 4 includes information about an input from each input section (specifically, each button, an analog stick, or each sensor) (specifically, information about an operation, and the result of detection by each sensor). In this non-limiting example, operation data is transmitted from the left controller 3 and/or the right controller 4 at predetermined time intervals through wireless communication. The operation data Da is updated with the received operation data. Note that the operation data Da may be updated for each frame that is the cycle of a process (described below) executed in the game system 1, or may be updated each time operation data is received through the wireless communication.

The angular velocity data Db indicates an angular velocity occurring on the main body apparatus 2. For example, the angular velocity data Db includes data indicating angular velocities about the x-, y-, and z-axes occurring on the main body apparatus 2, etc.

The acceleration data Dc indicates an acceleration occurring on the main body apparatus 2. For example, the acceleration data Dc includes data indicating accelerations in the x-, y-, and z-axis directions occurring on the main body apparatus 2, etc.

The orientation data Dd indicates the orientation of the main body apparatus 2 and the orientations of the left controller 3 and/or the right controller 4 in the real space. As a non-limiting example, the orientation data Dd includes data related to the orientation of the main body apparatus 2 based on a reference orientation, and data related to the orientations of the left controller 3 and/or the right controller 4 based on a reference orientation.

The enlargement/reduction axis data De indicates an enlargement/reduction axis set for an object OBJ set as an object to be operated. The enlargement direction data Df indicates the direction in which an object OBJ is enlarged along an enlargement/reduction axis.

The hold position data Dg indicates a hold position H specified for an object OBJ set as an object to be operated.

The enlargement/reduction amount data Dh indicates the amount of enlargement or the amount of reduction in which an object OBJ is deformed in an enlargement/reduction axis direction.

The deformation flag data Di indicates a deformation flag that is set "on" when a process of deforming an object OBJ is being performed.

The object data Dj indicates the position, direction, shape, size, and object axis, etc., of each object disposed in a virtual space.

The virtual camera data Dk indicates the position and direction of a virtual camera in a virtual space.

The image data Dm is for displaying an image (e.g., an object image, field image, background image, etc.) on a display screen (e.g., the display 12 of the main body apparatus 2).

Next, a specific non-limiting example of an information process in this non-limiting example game will be described with reference to FIGS. 21 and 22. FIG. 21 is a flowchart showing a non-limiting example of an information process that is executed by the game system 1. FIG. 22 is a subroutine showing a specific non-limiting example of an object deformation process performed in step S107 shown in FIG. 21. In this non-limiting example, a series of processes shown in FIGS. 21 and 22 are performed by the processor 81 executing a communication program and a predetermined application program (an editor program or a game program) included in the programs Pa. The information processes of FIGS. 21 and 22 are started with any suitable timing.

Figure 21:
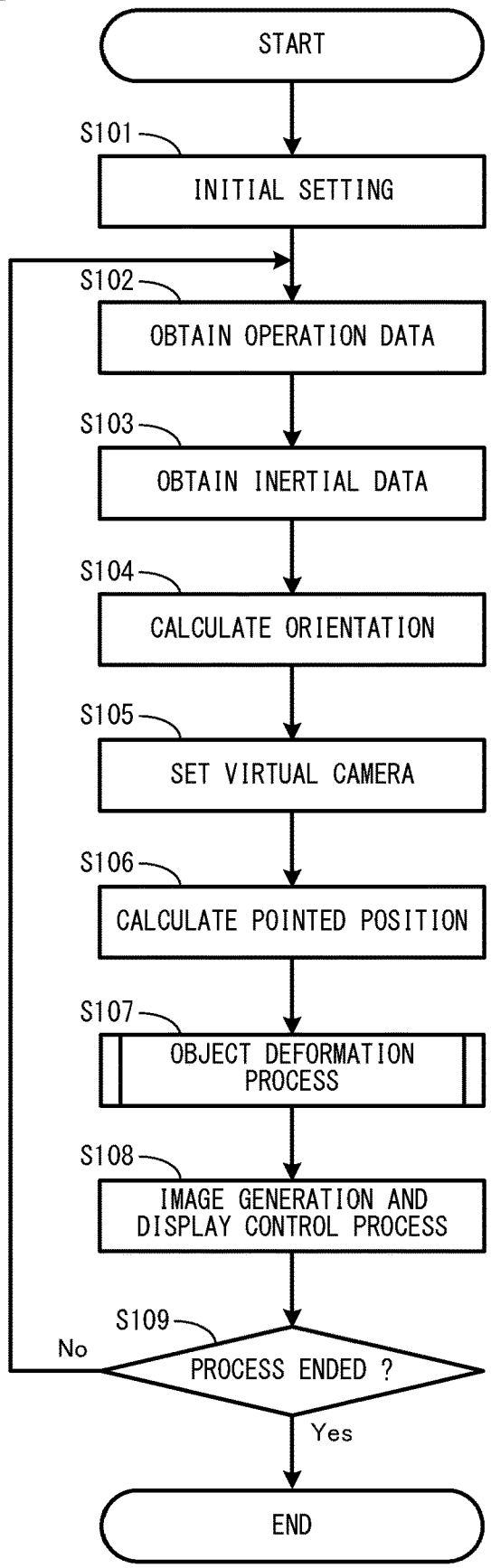
FIG. 21 is a flowchart showing a non-limiting example of an information process that is executed by the game system 1.
Figure 22:
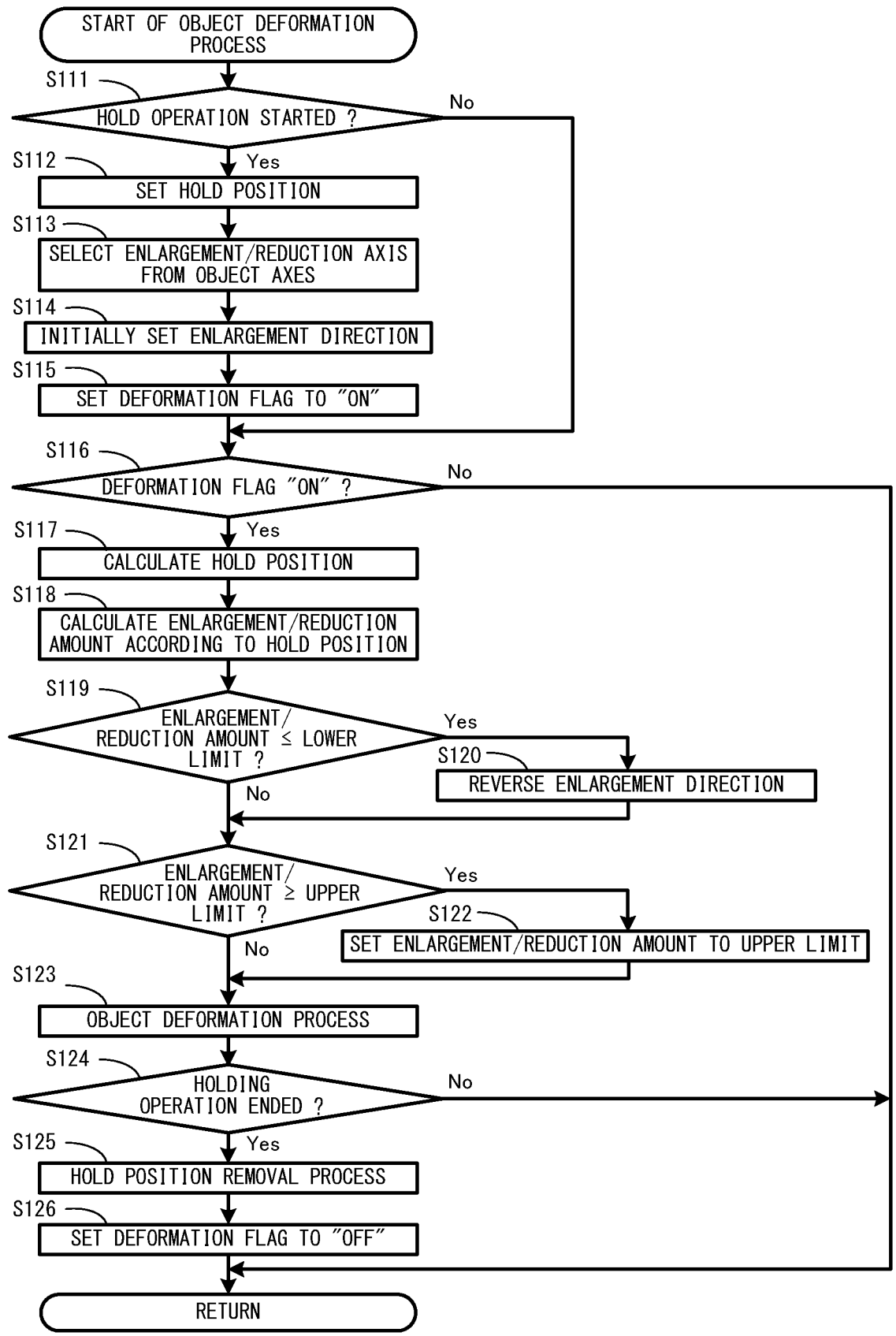
FIG. 22 is a subroutine showing a specific non-limiting example of an object deformation process performed in step S107 shown in FIG. 21.

Note that the steps in the flowcharts of FIGS. 21 and 22, which are merely illustrative, may be executed in a different order, or another step may be executed in addition to (or instead of) each step, if a similar effect is obtained. In this non-limiting example, it is assumed that the processor 81 executes each step of the flowcharts. Alternatively, a portion of the steps of the flowcharts may be executed by a processor or a dedicated circuit other than the processor 81. In addition, a portion of the steps executed by the main body apparatus 2 may be executed by another information processing apparatus that can communicate with the main body apparatus 2 (e.g., a server that can communicate with the main body apparatus 2 through a network). Specifically, the steps of FIGS. 21 and 22 may be executed by a plurality of information processing apparatuses including the main body apparatus 2 cooperating with each other.

In FIG. 21, the processor 81 performs initial setting for the information process (step S101), and proceeds to the next step. For example, in the initial setting, the processor 81 initializes parameters for performing processes described below. For example, the processor 81 specifies world coordinate axes in a virtual space, provides initial settings for the position and orientation (e.g., an orientation such that the line-of-sight direction is set to the horizontal direction, and the line-of-sight direction is set to the positive direction of the Z-axis as a world coordinate axis) of a virtual camera in the virtual space, and updates the virtual camera data Dk with the position and orientation thus initially set. The processor 81 also disposes a plurality of objects in the virtual space in which the world coordinate system has been set, to generate an initial state of the virtual space, and updates the object data Dj with the position, direction, shape, size, and object axis, etc., of each object. The processor 81 also sets initial orientations of the main body apparatus 2 and the left controller 3 and/or the right controller 4 in the real space, and updates the orientation data Dd. For example, the processor 81 sets the initial orientation of the main body apparatus 2 so that the depth direction of the display 12 of the main body apparatus 2 is the horizontal direction in the real space, and the downward direction (the negative direction of the y-axis shown in FIG. 1) of the main body apparatus 2 is the vertical direction in the real space. The processor 81 also sets the initial orientations of the left controller 3 and/or the right controller 4 so that the longitudinal directions (the positive direction of the y-axis shown in FIG. 1) of the left controller 3 and/or the right controller 4 are the depth direction of the display 12 of the main body apparatus 2, and indicate the center of the display 12.

Next, the processor 81 obtains operation data from the left controller 3 and/or the right controller 4 and updates the operation data Da (step S102), and proceeds to the next step.

Next, the processor 81 obtains inertial data (acceleration data and/or angular velocity data) from an inertial sensor (the acceleration sensor 89 and/or the angular velocity sensor 90) provided in the main body apparatus 2, updates the acceleration data Dc and/or the angular velocity data Db (step S103), and proceeds to the next step.

Next, the processor 81 calculates the orientations of the main body apparatus 2 and the left controller 3 and/or the right controller 4 (step S104), and proceeds to the next step. For example, the processor 81 obtains the angular velocities of the main body apparatus 2 about the x-, y-, and z-axes using angular velocity data stored in the angular velocity data Db. Thereafter, the processor 81 turns the x-, y-, and z-axes of the main body apparatus 2, having the orientation indicated by the orientation data Dd, according to the respective obtained angular velocities, and updates data indicating the orientation of the main body apparatus 2 in the orientation data Dd with the directions of the turned x-, y-, and z-axes. The processor 81 also obtains the angular velocities of the left controller 3 and/or the right controller 4 about the x-, y-, and z-axes using angular velocity data detected by the angular velocity sensors 105 and/or 115 of the left controller 3 and/or the right controller 4 and stored in the operation data Da. Thereafter, the processor 81 turns the x-, y-, and z-axes of the left controller 3 and/or the right controller 4, having the orientations indicated by the orientation data Dd, according to the respective obtained angular velocities, and updates data indicating the orientations of the left controller 3 and/or the right controller 4 in the orientation data Dd with the directions of the turned x-, y-, and z-axes.

Next, the processor 81 sets a virtual camera (step S105), and proceeds to the next step. For example, the processor 81 changes the orientation of the virtual camera in the virtual space according to a change in the orientation of the main body apparatus 2 in the real space calculated in step S104, and updates the virtual camera data Dk with the changed orientation of the virtual camera. Note that the orientation of the virtual camera may be calculated and changed by turning the top-bottom, left-right, and front-back axes of the virtual camera based on the angular velocities of the main body apparatus 2 about the x-, y-, and z-axes.

Next, the processor 81 calculates a pointed position that is pointed by the left controller 3 and/or the right controller 4 (step S106), and proceeds to the next step. For example, the processor 81 calculates, as the pointed position, the position on the display 12 pointed by the left controller 3 and/or the right controller 4, based on the orientations of the main body apparatus 2 and the left controller 3 and/or the right controller 4 indicated by the orientation data Dd. As a non-limiting example, the processor 81 calculates, as the pointed position, the position where the longitudinal direction (the positive direction of the y-axis shown in FIG. 1) of the left controller 3 and/or the right controller 4 intersects with the display 12 of the main body apparatus 2. Alternatively, the processor 81 may calculate, as the pointed position, a position outside the display 12.

Next, the processor 81 performs an object deformation process (step S107), and proceeds to step S108. The object deformation process performed in step S107 will now be described with reference to FIG. 22.

In FIG. 22, the processor 81 determines whether or not a holding operation has been started (step S111). For example, the result of the determination by the processor 81 in step S111 based on the operation data Da is positive if an operation of setting a hold start position (e.g., an operation of starting pressing down the operation button (A-button) 53 of the right controller 4 or an operation of starting pressing down the operation button (R-button) 60 of the right controller 4) is being performed with the pointed position calculated in step S106 located overlaying any of the plurality of objects disposed in the virtual space. If a holding operation has been started, the processor 81 proceeds to step S112. Otherwise, i.e., if a holding operation has not been started or if a hold position has already been set, the processor 81 proceeds to step S116.

In step S112, the processor 81 performs a process of setting a hold position, and proceeds to the next step. For example, the processor 81 sets a position on an object OBJ displayed and overlaid by the pointed position, based on a virtual space image which is displayed on the display 12 in an image generation and display control process in step S108 described below, as a hold position for the object OBJ, and updates the hold position data Dg with the hold position.

Next, the processor 81 selects and sets an enlargement/reduction axis from the object axes of the object OBJ for which the hold position has been set (step S113), and proceeds to the next step. Note that the processor 81 obtains the three object axes of the object OBJ for which the hold position has been set, by referring to the object data Dj, and updates the enlargement/reduction axis data De with the selected enlargement/reduction axis. The enlargement/reduction axis is selected using a method similar to that described above, and the method will not be described in detail.

Next, the processor 81 sets an initial enlargement direction (step S114), and proceeds to the next step. For example, the processor 81 sets an initial enlargement direction for each enlargement/reduction axis indicated by the enlargement/reduction axis data De, based on the hold position indicated by the hold position data Dg, and updates the enlargement direction data Df. The enlargement direction is set using a method similar to that described above, and the method will not be described in detail.

Next, the processor 81 sets the deformation flag to "on" (step S115), and proceeds to step S116. For example, the processor 81 sets the deformation flag to "on", and updates the deformation flag data Di.

In step S116, the processor 81 determines whether or not the deformation flag is "on" by referring to the deformation flag data Di. If the deformation flag is "on", the processor 81 proceeds to step S117. Otherwise, i.e., if the deformation flag is "off", the processor 81 ends the process of the subroutine.

In step S117, the processor 81 calculates the hold position, and proceeds to the next step. For example, the processor 81 calculates, as the hold position, a position in the virtual space overlaid by the pointed position calculated in step S106, and adds data indicating the hold position to the hold position data Dg.

Next, the processor 81 calculates an enlargement/reduction amount (the amount of enlargement or the amount of reduction) in which the object OBJ is to be enlarged or reduced according to the hold position (step S118), and proceeds to the next step. For example, the processor 81 calculates the movement amount and movement direction of the hold position using the previously calculated hold position and the currently calculated hold position indicated by the hold position data Dg, calculates the amount of enlargement or the amount of reduction with respect to each enlargement/reduction axis using the movement amount of the hold position, the movement direction of the hold position, the point-of-view position of the virtual camera indicated by the virtual camera data Dk, the central position indicated by the object data Dj of the object OBJ for which the hold position has been set, the enlargement/reduction axes indicated by the enlargement/reduction axis data De, and the enlargement direction for each enlargement/reduction axis indicated by the enlargement direction data Df, and updates the enlargement/reduction amount data Dh. Note that the enlargement/reduction amount for each enlargement/reduction axis is calculated using a method similar to that described above, and the method will not be described in detail.

Next, the processor 81 determines whether or not the size s(n) of the object OBJ is smaller than or equal to a predetermined lower limit value when the object OBJ is reduced in the amount of reduction calculated in step S118 (step S119). If the size s(n) of the object OBJ is smaller than or equal to the predetermined lower limit value, the processor 81 proceeds to step S120. Otherwise, i.e., if the size s(n) of the object OBJ is not smaller than or equal to the predetermined lower limit value, the processor 81 proceeds to step S121.

In step S120, the processor 81 reverses the enlargement direction set as the direction of an enlargement axis for which the size s(n) of the object OBJ is smaller than or equal to the lower limit value, on the enlargement axis, and proceeds to step S121. For example, by referring to the enlargement direction data Df, the processor 81 sets the enlargement direction of an enlargement axis for which the size s(n) of the object OBJ is smaller than or equal to the lower limit value, of the enlargement directions sets for the enlargement axes, to the opposite direction of the enlargement axis, and updates the enlargement direction data Df.

In step S121, the processor 81 determines whether or not the size s(n) of the object OBJ is greater than or equal to a predetermined upper limit value when the object OBJ is enlarged in the amount of enlargement calculated in step S118. If the size s(n) of the object OBJ is greater than or equal to the predetermined upper limit value, the processor 81 proceeds to step S122. Otherwise, i.e., if the size s(n) of the object OBJ is not greater than or equal to the predetermined upper limit value, the processor 81 proceeds to step S123.

In step S122, the processor 81 sets the size s(n), to which the object OBJ which is greater than or equal to the upper limit value is to be enlarged, to the upper limit value (i.e., the amount of enlargement is set to zero), and proceeds to step S123. For example, the processor 81 updates each parameter so that the size s(n) of the object OBJ is set to the upper limit value. As a non-limiting example, the processor 81 sets the amount of enlargement which causes the size s(n) of the object OBJ to be greater than or equal to the upper limit value, of the enlargement/reduction amounts indicated by the enlargement/reduction amount data Dh, to zero, and updates the amount of enlargement.

In step S123, the processor 81 performs a process of deforming the object OBJ for which the hold position has been set, based on the set enlargement/reduction amounts, and proceeds to the next step. For example, the processor 81 deforms (enlarges/reduces) the object OBJ based on the enlargement/reduction amount for each enlargement/reduction axis indicated by the enlargement/reduction amount data Dh and the deformation condition of the object OBJ as an object to be operated, and updates the object data Dj based on the deformed shape of the object OBJ. When the position of an object axis of the object OBJ is changed due to the deformation of the object OBJ, the processor 81 also updates the enlargement/reduction axis data De, the enlargement direction data Df, and the object data Dj based on the change of the object axis. Note that the object OBJ is deformed using a method similar to that described above, and the method will not be described in detail.

Next, the processor 81 determines whether or not an operation of ending the holding operation has been performed (step S124). For example, the result of the determination by the processor 81 referring to the operation data Da in step S124 is positive if an operation of ending the holding operation (e.g., an operation (releasing) of ending pressing down the operation button (A-button) 53 of the right controller 4, an operation (releasing) of ending pressing down the operation button (R-button) 60 of the right controller 4, or a cancelling operation by pressing down another button (e.g., B-button) of the right controller 4) has been performed. If an operation of ending the holding operation has been performed, the processor 81 proceeds to step S125. Otherwise, i.e., if an operation of ending the holding operation has not been performed, the processor 81 ends the process of the subroutine.

In step S125, the processor 81 performs a process of removing the hold position, and proceeds to the next step. For example, the processor 81 performs a process of initializing and updating each parameter for deforming the object OBJ (the enlargement/reduction axis data De, the enlargement direction data Df, the hold position data Dg, and the enlargement/reduction amount data Dh).

Next, the processor 81 sets the deformation flag to "off", and ends the process of the subroutine. For example, the processor 81 sets the deformation flag to "off", and updates the deformation flag data Di.

Referring back to FIG. 21, after the object deformation process of step S107, the processor 81 performs the image generation and display control process (step S108), and proceeds to the next step. For example, the processor 81 disposes a plurality of objects in the virtual space based on the object data Dj to generate the virtual space. If the deformation flag indicated by the deformation flag data Di is "on" (the process of deforming the object is being performed), the processor 81 also adds and displays the first enlargement direction image De1 and/or the second enlargement direction image De2 to the object OBJ as an object to be operated, by referring to the enlargement/reduction axis data De and the enlargement direction data Df. If the deformation flag indicated by the deformation flag data Di is "on", the processor 81 also disposes a hold position mark H at a position indicated by the hold position data Dg. If the deformation flag indicated by the deformation flag data Di is "off" (the process of deforming the object is not being performed), the processor 81 disposes a mark T at the pointed position calculated in step S106. Thereafter, the processor 81 disposes a virtual camera in the virtual space based on the virtual camera data Dk, generates a virtual space image as viewed from the virtual camera, and displays the virtual space image on the display 12. Note that the hold position mark H and the mark T may be synthesized overlaying the virtual space image of the virtual space in which the plurality of objects, etc., are disposed, as viewed from the virtual camera.

Next, the processor 81 determines whether or not to end the process (step S109). The condition for ending the process in step S109 is, for example, that the condition for ending the process is satisfied, that the user has performed an operation of ending the process, etc. If the processor 81 does not determine to end the process, the processor 81 returns to step S102, and repeats the process. If the processor 81 determines to end the process, the processor 81 ends the process of the flowchart. Thereafter, steps S102-S109 are repeatedly executed until the processor 81 determines, in step S109, to end the process.

Thus, in this non-limiting example, in the case where an object is enlarged and/or reduced in a virtual space, one or two of three object axes set for the object are set as an enlargement/reduction axis based on the orientation of the object in the virtual space. Therefore, the object can be enlarged and/or reduced as intended by the user.

Note that, in the above non-limiting examples, the method for detecting the orientations of the main body apparatus 2, the left controller 3, and the right controller 4 is merely illustrative. The orientations of the main body apparatus 2, the left controller 3, and the right controller 4 may be detected using other methods and other data. In addition to or instead of the left controller 3 and/or the right controller 4, other controllers for performing an operation of moving an object may be used.

The game system 1 may be any suitable apparatus, including a handheld game apparatus, or any suitable handheld electronic apparatus (a personal digital assistant (PDA), mobile telephone, personal computer, camera, tablet computer, etc.), etc. In that case, an input apparatus for performing an operation of moving an object may be, instead of the left controller 3 or the right controller 4, another controller, mouse, touchpad, touch panel, trackball, keyboard, directional pad, slidepad, etc.

In the above non-limiting examples, all the process steps are performed in the game system 1. Alternatively, at least a portion of the process steps may be performed in another apparatus. For example, when the game system 1 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting examples, the information process can be performed by the processor 81 of the game system 1 executing a predetermined program. Alternatively, all or a portion of the above process may be performed by a dedicated circuit included in the game system 1.

Here, according to the above non-limiting variation, this non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and this non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement this non-limiting example.

The above program may be supplied to the game system 1 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example and common technical knowledge. It should be understood throughout the present specification that expression of a singular form includes the concept of their plurality unless otherwise mentioned. Specifically, articles or adjectives for a singular form (e.g., "a", "an", "the", etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example pertain. If there is any inconsistency or conflict, the present specification (including the definitions) shall prevail.

As described above, this non-limiting example is applicable as an information processing program, information processing apparatus, information processing system, and information processing method, etc., that can enlarge and/or reduce, etc., an object in a virtual space as intended by the user.

What is claimed is:

1. A non-transitory computer-readable storage medium having stored therein an information processing program which is executed by a computer of an information processing apparatus and is configured for enlarging or reducing an object in a virtual space, the information processing program causing the computer to provide execution comprising:
    disposing, in the virtual space, a three-dimensional object for which three orthogonal object axes are set, wherein three fixed, orthogonal world coordinate axes are set in the virtual space;
    selecting two world coordinate axes from the three world coordinate axes, based on a position and orientation of the three-dimensional object with respect to a virtual camera in the virtual space;
    determining two of the three object axes as an enlargement/reduction axis using a positional relationship between the two selected world coordinate axes and the three object axes;
    associating a user's operation input with the enlargement/reduction axes; and
    enlarging or reducing the three-dimensional object based on the association of the user's operation input with the enlargement/reduction axes.

2. The non-transitory computer-readable storage medium according to claim 1, wherein
    the three-dimensional object is enlarged or reduced in directions pointed by the two enlargement/reduction axes, based on the association.

3. The non-transitory computer-readable storage medium according to claim 2, wherein
    the directions pointed by the two enlargement/reduction axes are each associated with a positive direction for enlargement or a negative direction for reduction, based on a surface position of the three-dimensional object overlaid by a pointed position indicated by the user's operation input.

4. The non-transitory computer-readable storage medium according to claim 3, wherein
    each of the three object axes passes through a reference point fixed in the three-dimensional object, and
    when an intersection point obtained by projecting the surface position of the three-dimensional object corresponding to the pointed position perpendicularly onto each of the two enlargement/reduction axes is moved away from the reference point, the axis direction is associated with enlargement, and when the intersection point is moved toward the reference point, the axis direction is associated with reduction.

5. The non-transitory computer-readable storage medium according to claim 4, wherein
    the enlarging or reducing the object includes setting, as an enlargement/reduction intersection point, an intersection point between a plane including an aiming direction connecting a virtual camera in the virtual space and a position in the virtual space corresponding to the pointed position, and a direction pointing from the virtual camera toward a first one of the two enlargement/reduction axes, and a straight line extending from the reference point pointing in a direction pointed by a second one of the two enlargement/reduction axes, and calculating an amount of enlargement or an amount of reduction of the object along the second one of the two enlargement/reduction axes, according to the amount of movement of the enlargement/reduction intersection point occurring according to movement of the pointed position.

6. The non-transitory computer-readable storage medium according to claim 1, wherein
    when the user's operation input for moving the pointed position in a first direction is continued even after the three-dimensional object is enlarged to an upper limit according to the amount of an operation of moving the pointed position in the first direction according to the user's operation input, the enlargement of the three-dimensional object is stopped and maintained at the upper limit, and when the user's operation input is switched from the user's operation input for moving the pointed position maintained at the upper limit in the first direction to the user's operation input for moving the pointed position in a second direction opposite to the first direction, the three-dimensional object is reduced according to an amount of an operation of moving the pointed position in the second direction from the switching time point.

7. The non-transitory computer-readable storage medium according to claim 1, wherein
    the three-dimensional object is reduced in a first reduction direction according to the user's operation input in a third direction, and the three-dimensional object is enlarged in a first enlargement direction opposite to the first reduction direction according to the user's operation input in a fourth direction,
    when the user's operation input in the third direction is continued after the three-dimensional object is reduced to a lower limit in the first reduction direction according to the user's operation input in the third direction, the three-dimensional object is enlarged in the first enlargement direction after the three-dimensional object reaches the lower limit, and
    when the user's operation input in the fourth direction is performed after the three-dimensional object reaches the lower limit and then the three-dimensional object is enlarged in the first enlargement direction, the three-dimensional object is reduced in the first reduction direction.

8. The non-transitory computer-readable storage medium according to claim 1, wherein
the virtual space has a field surface,
when the three-dimensional object is enlarged, overlapping the field surface, a state that the three-dimensional object is enlarged or reduced with the overlapping maintained is displayed on a display section, and
when the three-dimensional object overlaps the field surface at the time that the enlargement or reduction of the three-dimensional object is finished, the three-dimensional object is moved to a position where the overlapping state is eliminated, and is displayed on the display section.

9. The non-transitory computer-readable storage medium according to claim 1, wherein
a plurality of three-dimensional objects are disposed in the virtual space,
when a first one of the three-dimensional objects is enlarged overlapping with a second one of the three-dimensional objects, a state that the first one of the three-dimensional objects is enlarged or reduced with the overlapping state maintained is displayed on a display section, and
when the first one of the three-dimensional objects overlaps with the second one of the three-dimensional objects at the time that the enlargement or reduction of the three-dimensional object is finished, a state that the first one of the three-dimensional objects is maintained at a position where the first one of the three-dimensional objects is maintained in the overlapping state is displayed on the display section.

10. The non-transitory computer-readable storage medium according to claim 1, wherein
a screen coordinate system having three screen coordinate axes with reference to a position and orientation of a virtual camera in the virtual space is set, and
two screen coordinate axes are selected from the three screen coordinate axes based on the orientation of the virtual camera and the orientation of the three-dimensional object, and the enlargement/reduction axes are determined using a positional relationship between the two selected screen coordinate axes and the three object axes.

11. The non-transitory computer-readable storage medium according to claim 1, wherein
one or two of the three object axes having a smallest differential angle with respect to a screen plane based on an orientation of a virtual camera in the virtual space are determined as the enlargement/reduction axes.

12. The non-transitory computer-readable storage medium according to claim 1, wherein
in the virtual space, one or two of the three object axes having a greatest differential angle with respect to a line-of-sight direction of a virtual camera in the virtual space are determined as the enlargement/reduction axes.

13. The non-transitory computer-readable storage medium according to claim 1, wherein
a first direction from a position of the three-dimensional object toward a projection position along the enlargement/reduction axes is set as an enlargement direction, and a second direction from the projection position toward the position of the three-dimensional object along the enlargement/reduction axes is set as the reduction direction.

14. An information processing apparatus configured to enlarge or reduce an object in a virtual space, the information processing apparatus comprising:
a display device; and
processing circuitry operatively coupled to the display device and including at least one processor, wherein the processing circuitry is configured to:
dispose, in the virtual space, a three-dimensional object for which three orthogonal object axes are set, wherein three fixed, orthogonal world coordinate axes are set in the virtual space;
select two world coordinate axes from the three world coordinate axes, based on a position and orientation of the three-dimensional object with respect to a virtual camera in the virtual space;
determine two of the three object axes as an enlargement/reduction axis using a positional relationship between the two selected world coordinate axes and the three object axes;
associate a user's operation input with the enlargement/reduction axes; and
enlarge or reduce the three-dimensional object based on the association of the user's operation input with the enlargement/reduction axes.

15. An information processing system configured to enlarge or reduce an object in a virtual space, the information processing system comprising:
a processor; and
a memory configured to store computer readable instructions that, when executed by the processor, cause the information processing system to:
dispose, in the virtual space, a three-dimensional object for which three orthogonal object axes are set, wherein three fixed, orthogonal world coordinate axes are set in the virtual space;
select two world coordinate axes from the three world coordinate axes, based on a position and orientation of the three-dimensional object with respect to a virtual camera in the virtual space;
determine two of the three object axes as an enlargement/reduction axis using a positional relationship between the two selected world coordinate axes and the three object axes;
associate a user's operation input with the enlargement/reduction axes; and
enlarge or reduce the three-dimensional object based on the association of the user's operation input with the enlargement/reduction axes.

16. An information processing method for enlarging or reducing an object in a virtual space, comprising:
disposing, in the virtual space, a three-dimensional object for which three orthogonal object axes are set, wherein three fixed, orthogonal world coordinate axes are set in the virtual space;
selecting two world coordinate axes from the three world coordinate axes, based on a position and orientation of the three-dimensional object with respect to a virtual camera in the virtual space;
determining two of the three object axes as an enlargement/reduction axis using a positional relationship between the two selected world coordinate axes and the three object axes;

associating a user's operation input with the enlargement/
reduction axes; and
enlarging or reducing the three-dimensional object based
on the association of the user's operation input with the
enlargement/reduction axes.

* * * * *